(12) United States Patent
Wormald et al.

(10) Patent No.: US 8,260,331 B2
(45) Date of Patent: Sep. 4, 2012

(54) SYSTEM AND METHOD FOR INCORPORATING MULTIMEDIA CONTENT INTO A MESSAGE HANDLED BY A MOBILE DEVICE

(75) Inventors: Christopher R. Wormald, Waterloo (CA); Martyn Henri Mallick, Waterloo (CA); James Laurence Balsillie, Waterloo (CA)

(73) Assignee: Research In Motion Limited, Waterloo (CA)

( * ) Notice: Subject to any disclaimer, the term of this patent is extended or adjusted under 35 U.S.C. 154(b) by 519 days.

(21) Appl. No.: 12/507,355

(22) Filed: Jul. 22, 2009

(65) Prior Publication Data

US 2010/0041422 A1 Feb. 18, 2010

Related U.S. Application Data

(60) Provisional application No. 61/087,013, filed on Aug. 7, 2008.

(51) Int. Cl.
*H04W 4/00* (2009.01)

(52) U.S. Cl. ........ 455/466; 715/205; 715/234; 715/255; 707/951; 707/913

(58) Field of Classification Search .................. 455/466; 709/206, 207, 203, 227, 218, 217, 219, 212, 709/228; 705/14.73; 370/352, 486, 432, 370/270, 401, 463, 389; 600/544; 340/691.6, 340/463, 464, 988, 990, 425.5; 187/396; 715/767, 808; 348/E7.071; 379/90.01

See application file for complete search history.

(56) References Cited

U.S. PATENT DOCUMENTS

| | | | |
|---|---|---|---|
| 7,299,050 B2 | 11/2007 | Delaney et al. | |
| 7,343,317 B2 * | 3/2008 | Jokinen et al. | 705/14.64 |
| 7,496,845 B2 * | 2/2009 | Deutscher et al. | 715/726 |
| 7,689,589 B2 * | 3/2010 | Wong et al. | 707/999.107 |
| 7,945,848 B2 * | 5/2011 | Kasperkiewicz et al. | 715/205 |

(Continued)

FOREIGN PATENT DOCUMENTS

WO    WO 2008/024690 A2    2/2008

(Continued)

OTHER PUBLICATIONS

"Simply the Easiest SMS Gateway and Mobile Markerting platform available", http://www.mobilemarketing.net/, Accessed at lease on Nov. 13, 2007.

(Continued)

*Primary Examiner* — Jean Gelin
*Assistant Examiner* — Mahendra Patel
(74) *Attorney, Agent, or Firm* — Brett J. Slaney; Blake, Cassels & Graydon LLP

(57) ABSTRACT

Multimedia content can be incorporated into a message handled by a mobile device with minimum invasiveness by utilizing linking mechanisms that are visually identifiable with certain content and can reveal the multimedia content, e.g. an advertisement, upon selection. This may be done by examining content in the message handled by a mobile device and matching portions of the message with predetermined criteria such as keywords or phrases. Upon finding matches, corresponding multimedia content is associated with a respective portion of the message content and access to the multimedia content is enabled through selection of a linking mechanism that is visually identifiable with the respective portion of the message. The message is modified to include such linking mechanisms such that upon viewing the modified message, a user may reveal the multimedia content by selecting the linking mechanism.

38 Claims, 13 Drawing Sheets

U.S. PATENT DOCUMENTS

| | | | |
|---|---|---|---|
| 2003/0114170 A1 | 6/2003 | Rick et al. | |
| 2004/0224705 A1 | 11/2004 | Nishimura | |
| 2005/0138143 A1 | 6/2005 | Thompson | |
| 2005/0227679 A1* | 10/2005 | Papulov | 455/414.3 |
| 2006/0277271 A1 | 12/2006 | Morse et al. | |
| 2006/0286989 A1 | 12/2006 | Illion | |
| 2007/0061328 A1* | 3/2007 | Ramer et al. | 707/10 |
| 2007/0109186 A1 | 5/2007 | Fujiwara et al. | |
| 2007/0204027 A1 | 8/2007 | Shih et al. | |
| 2007/0204057 A1 | 8/2007 | Shaver et al. | |
| 2007/0266403 A1 | 11/2007 | Ou et al. | |
| 2008/0072139 A1* | 3/2008 | Salinas et al. | 715/238 |
| 2008/0294522 A1* | 11/2008 | Teterin | 705/14 |
| 2009/0307207 A1* | 12/2009 | Murray | 707/5 |

FOREIGN PATENT DOCUMENTS

| | | |
|---|---|---|
| WO | WO 2008/091179 A2 | 7/2008 |

OTHER PUBLICATIONS

"Mobile Ad Targeting", http://advertising.4info.net/solutions/ad-targeting.php, Accessed at least on Nov. 13, 2007.

"Jinny Software Ltd." http://www.jinny/ie/mobile-advertising/the-jinny-advertising-service-for-operators.268.html, Accessed at least on Nov. 13, 2007.

"Partnering for strength in mobile advertising", http:www.itp.net/popup/print/534500. Accessed at least on Nov. 13, 2007.

"Psiloc: Location Aware Applications", http://www.psiloc.com/en/Expertise_and_Skills/Fields_of_Expertise/803_Location_Aware_Applications, Accessed at least on Nov. 13, 2007.

Caracas, Alexandru, ION, Iulia, ION, Mihaela. "Web Services and Data Caching for Java Mobile Clients", International University in Germany, 76646 Bruchsal, Germany, Jan. 27, 2007.

Cheng, Jacqui, "Mobile Ads Move Out of the Browser", http://arstechnica.com/gadgets/news/2007/08/mobile-ads-move-out-of-the-browser.ars, updated Aug. 8, 2007.

Belic, Dusan, "Motorola launches Motocast; Wants to push content directly to your phone's home screen", http://www.intomobile.com/2007/06/09/motorola-launches-motocast-wants-to-push-content-directly-to-your-phones-home-screen.html, Jun. 9, 2007.

"Google Ads on Mobile Phones", http://www.tomw.net.au/technology/it/google_mobile_ads.php?slides, Oct. 15, 2007.

Amini, Reza, "Keyboard-Based Advertisements on Mobile Phones in the USA and the UK", http://mobile14.com?p=2355, Oct. 4, 2006.

* cited by examiner

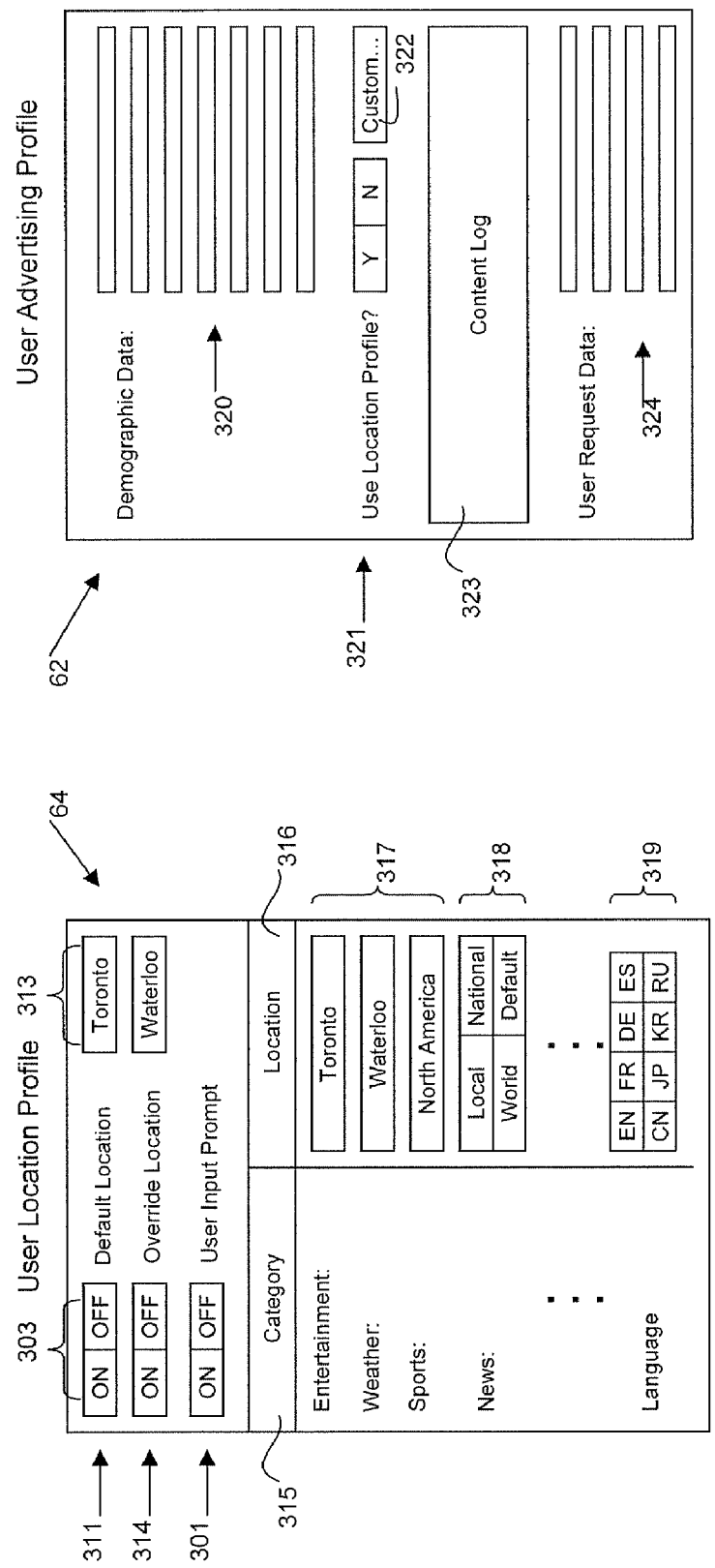

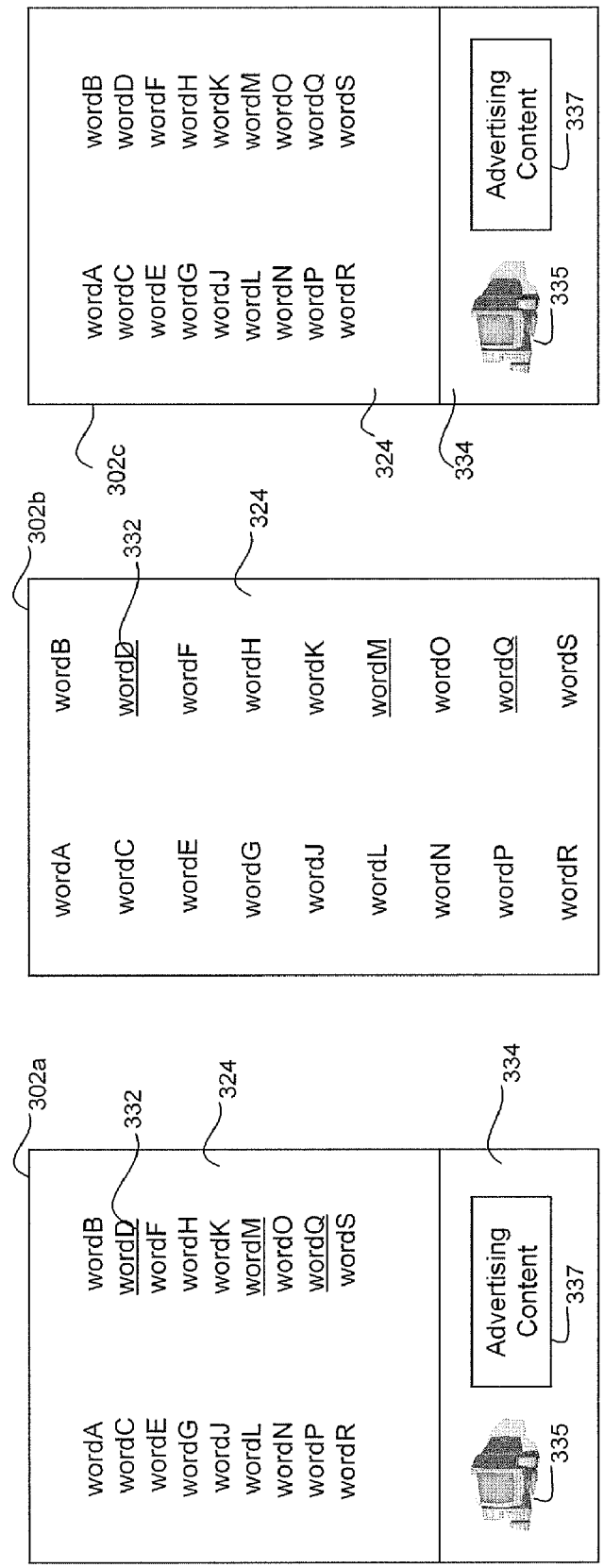

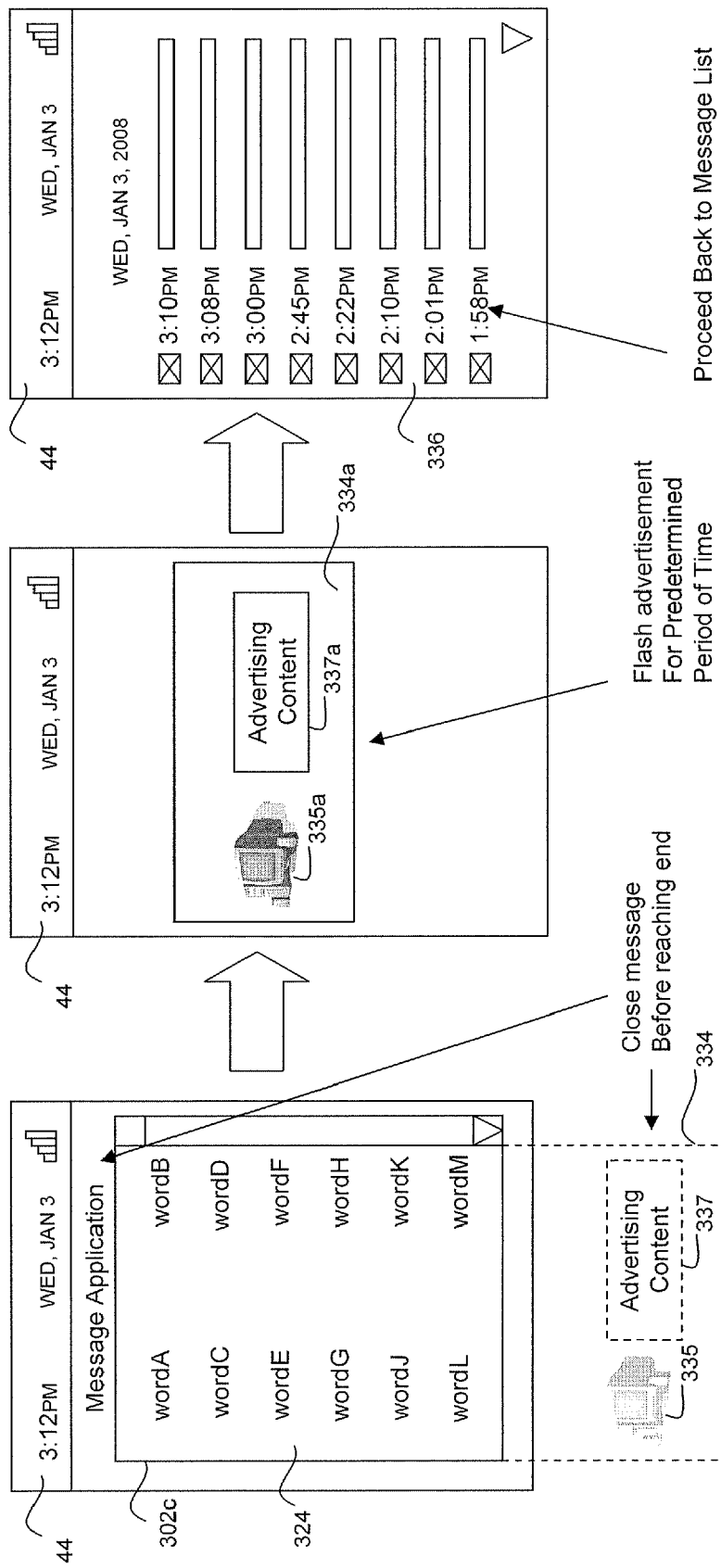

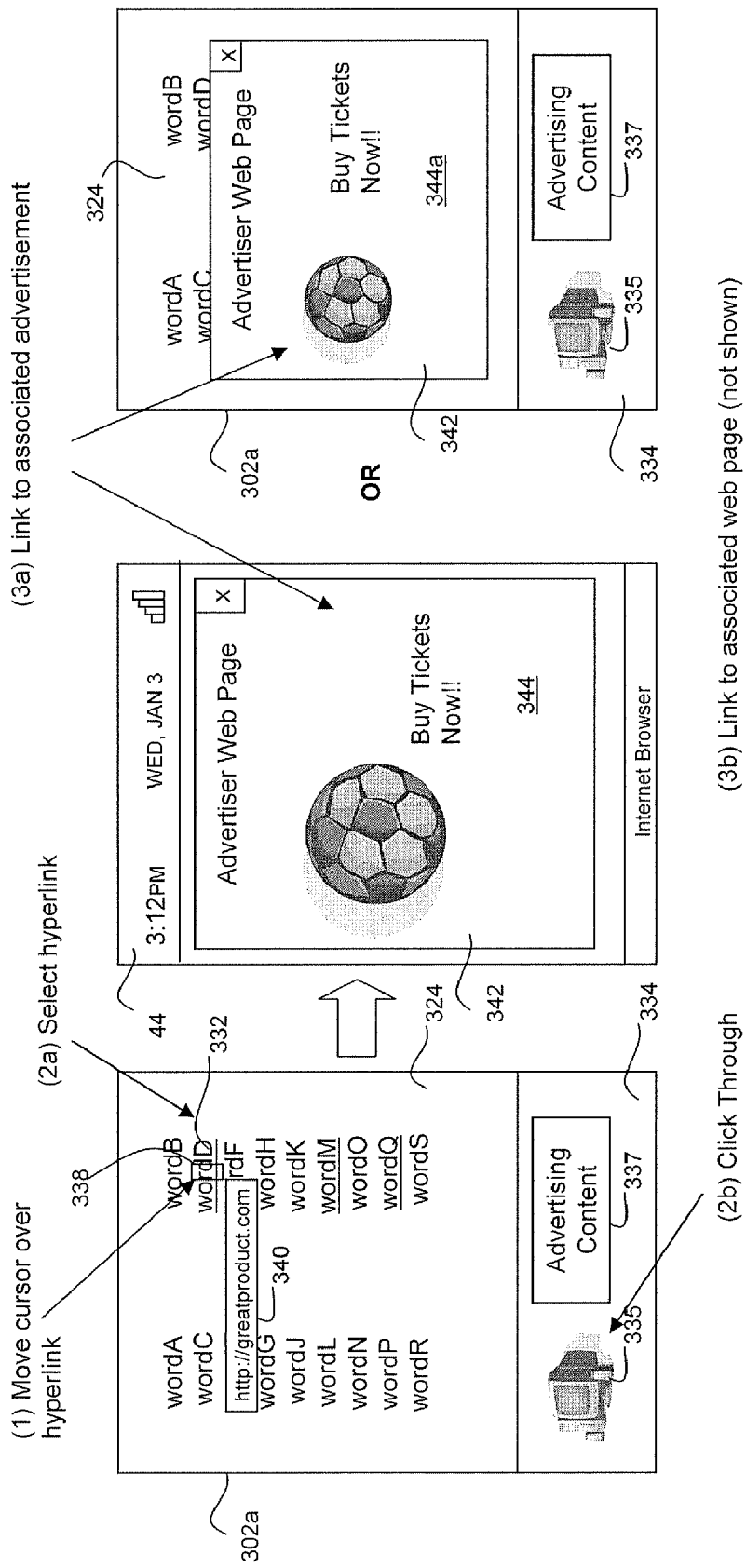

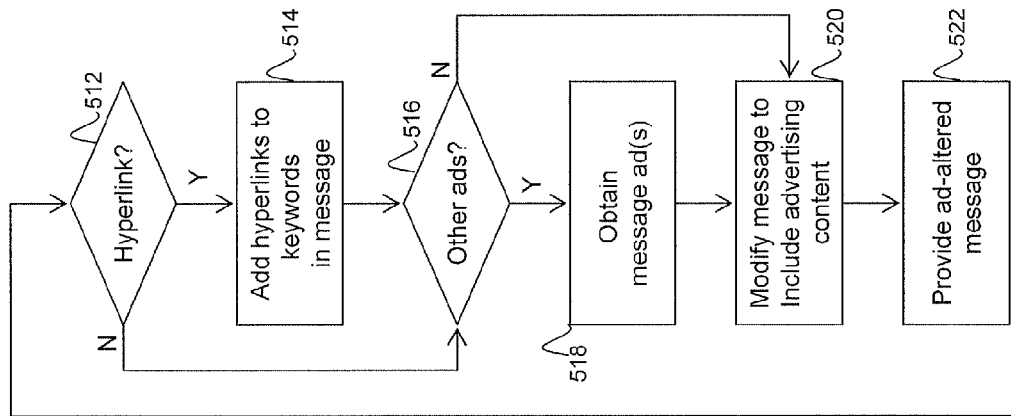
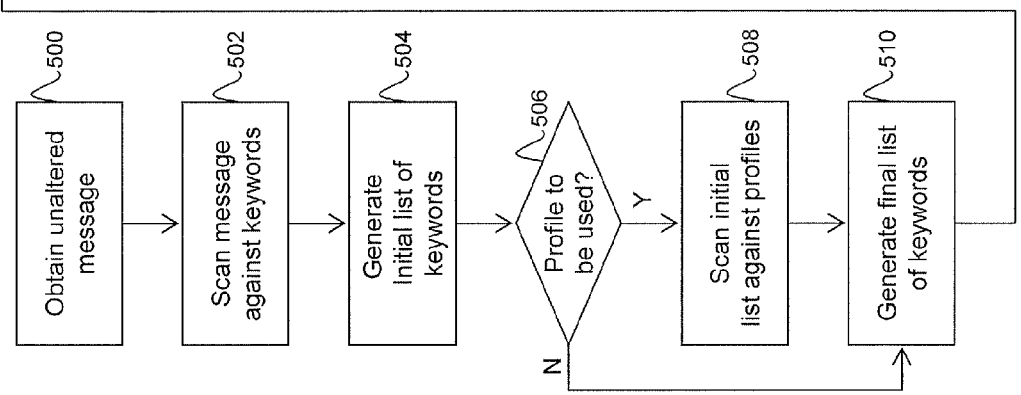
Figure 13
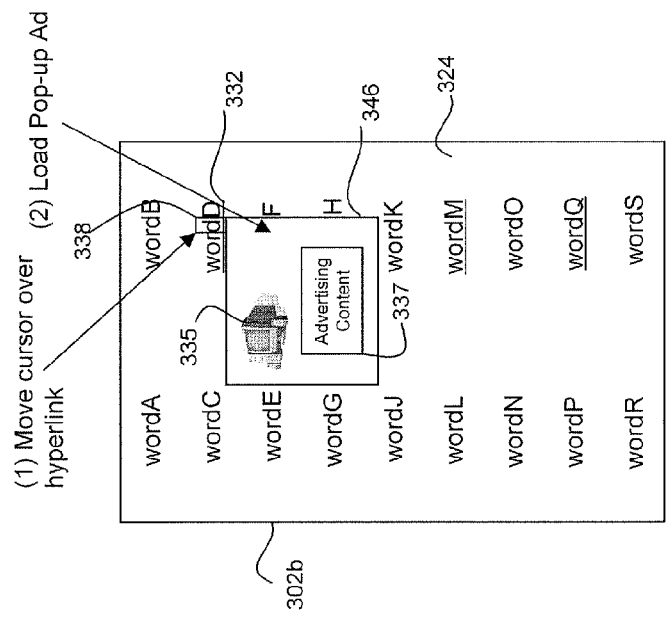
Figure 12

SYSTEM AND METHOD FOR INCORPORATING MULTIMEDIA CONTENT INTO A MESSAGE HANDLED BY A MOBILE DEVICE

This application claims priority from U.S. provisional application No. 61/087,013 filed on Aug. 7, 2008, the contents of which are incorporated herein by reference.

TECHNICAL FIELD

The following relates generally to mobile telecommunications, and more particularly, to systems and methods for incorporating multimedia content into a message handled by a mobile device.

DESCRIPTION OF THE RELATED ART

Advertising, both direct advertising and that which is associated with a provided service (e.g. brought to you by Company X) may be used as a way to offset the cost of providing such a service, e.g. wherein the advertiser pays for all or part of the service in exchange for a venue to present advertising content to one or more users. Advertising may only be effective if the user is interested in the content and can become a nuisance if the user is overwhelmed with too much content, or content that may be deemed inappropriate or irrelevant.

Accordingly, the way in which advertising content is gathered and distributed is generally done with the end user in mind. When advertising through television, radio and the Internet, advertising content is traditionally directed to what the likely audience would be for the delivered content. This can be a useful way for advertisers to be confident that they are advertising in the most appropriate venue, at least in a general sense, but may only work when broadcasting according to a schedule or associating the advertising content with a particular medium such as a website that has a specific purpose or target audience.

On a mobile device, although the user may have access to such broadcasted content and may be able to access particular media, various other uses of the mobile device may command the user's attention at various times during a given day. As such, advertising on a mobile device can be more challenging than simply associating generic advertising content with a given medium.

BRIEF DESCRIPTION OF THE DRAWINGS

Embodiments will now be described by way of example only with reference to the appended drawings wherein:

FIG. 7 is a screen shot showing an exemplary user interface (UI) for a user location profile in accordance with one embodiment.

FIG. 8 is a screen shot showing an exemplary user interface (UI) for a user portal profile in accordance with one embodiment.

FIGS. 9(a) to 9(c) are exemplary screen shots illustrating variations of the modified message in accordance with one embodiment.

FIGS. 10(a) to 10(c) are exemplary screen shots illustrating the display of the advertising content upon closing the modified message when the advertising content has not been viewed in accordance with one embodiment.

FIGS. 11(a) to 11(c) are exemplary screen shots illustrating the launch of additional advertising content through hyperlinked portions of the modified message in alternative embodiments.

FIG. 12 is an exemplary screen shot illustrating the launch of a pop-up ad in the modified message through a hyperlinked portion of the modified message in accordance with one embodiment.

FIG. 13 is a flow diagram illustrating a method of generating the modified message from an incoming or outgoing message in accordance with one embodiment.

DETAILED DESCRIPTION

Figure 1:
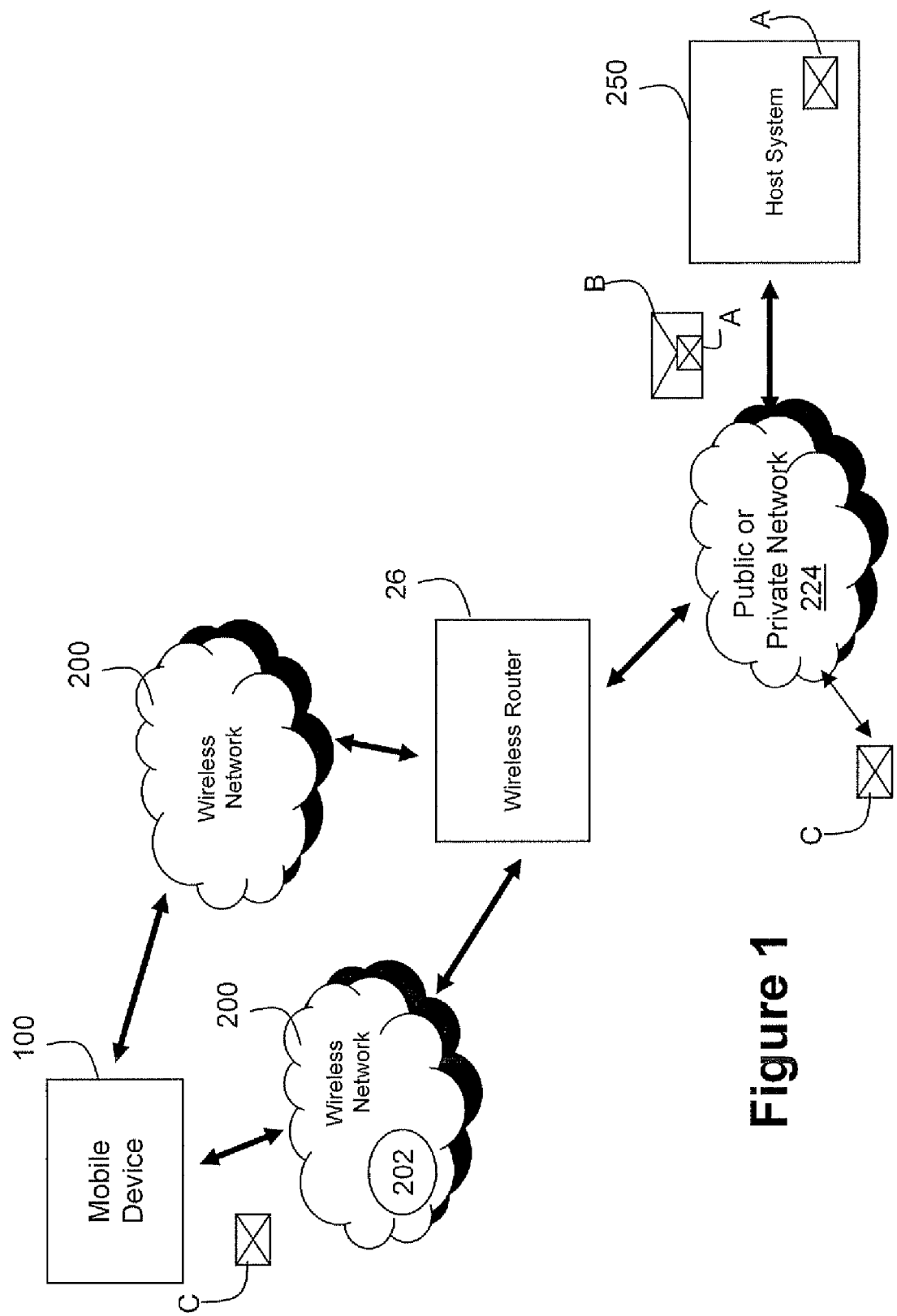
FIG. 1 is a block diagram illustrating an exemplary environment in which data items are pushed from a host system to a mobile device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It has been recognized that multimedia content can be incorporated into a message handled by a mobile device with minimum invasiveness by utilizing linking mechanisms that are visually identifiable with certain content and can reveal the multimedia content, e.g. an advertisement, upon selection. This may be done by examining content in the message handled by a mobile device and matching portions of the message with predetermined criteria such as keywords or phrases. Upon finding matches, corresponding multimedia content is associated with a respective portion of the message content and access to the multimedia content is enabled through selection of a linking mechanism that is visually identifiable with the respective portion of the message. The message is modified to include such linking mechanisms such that upon viewing the modified message, a user may reveal the multimedia content by selecting the linking mechanism. It has also been recognized that multiple layers of multimedia content can be provided such that different types of user interaction can reveal different forms of multimedia content. As will be described and exemplified below, the methods, systems and computer readable media for implementing this are particularly suitable for incorporating advertising content into mobile communications.

Examples of applicable communication devices include without limitation pagers, cellular phones, satellite phones, smart-phones, wireless organizers, personal digital assistants, computers, laptops, handheld wireless communication devices, wirelessly enabled notebook computers, wireless media players, wireless navigation devices, wireless heart or exercise monitors, and the like. Such devices will hereinafter be commonly referred to as "mobile devices" for ease of illustration.

An exemplary mobile device generally comprises a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities).

The mobile device may be one that is used in a system that is configured for continuously routing all forms of pushed information from a host system to the mobile device. One example of such a system will now be described.

Referring now to the drawings, FIG. 1 is a block diagram showing an exemplary system for the redirection of user data items (such as message A or C) from a corporate enterprise computer system (host system) 250 to the user's mobile device 100 via a wireless router 26. The wireless router 26 provides the wireless connectivity functionality as it acts to both abstract most of the wireless network's 200 complexities, and it also implements features to support pushing data to the mobile device 100. Although not shown, a plurality of mobile devices may access data from the host system 250. In this example, message A in FIG. 1 represents an internal message sent from, e.g. a desktop computer 262 within the host system 250 (see FIG. 11), to any number of server computers in the corporate network 260 (e.g. LAN), which may, in general, comprise a database server, a calendar server, an E-mail server or a voice-mail server. More detail concerning the host system 250 will be provided below and is shown in FIG. 11.

Message C in FIG. 1 represents an external message from a sender that is not directly connected to the host system 250, such as the user's mobile device 100, some other user's mobile device (not shown), or any user device connected to the public or private network 224 (e.g. the Internet). Message C could be e-mail, voice-mail, calendar information, database updates, web-page updates or could even represent a command message from the user's mobile device 100 to the host system 250. The host system 250 may comprise, along with the typical communication links, hardware and software associated with a corporate enterprise computer network system, one or more wireless mobility agents, a TCP/IP connection, a collection of datastores, (for example a data store for e-mail could be an off-the-shelf mail server like Microsoft Exchange® Server or Lotus Notes® Server), all within and behind a corporate firewall as will be explained further below.

The mobile device 100 may be adapted for communication within wireless network 200 via wireless links, as required by each wireless network 200 being used. As an illustrative example of the operation for a wireless router 26 shown in FIG. 1, consider a data item A, repackaged in outer envelope B (the packaged data item A now referred to as "data item (A)") and sent to the mobile device 100 from an Application Service Provider (ASP) in the host system 250. Within the ASP is a computer program, similar to a wireless mobility agent, running on any computer in the ASP's environment that is sending requested data items from a data store to a mobile device 100. The mobile-destined data item (A) is routed through the network 224, and through the wireless router's 26 firewall 27 protecting the wireless router 26 (see also FIG. 8).

Although the above describes the host system 250 as being used within a corporate enterprise network environment, this is just one embodiment of one type of host service that offers push-based messages for a handheld wireless device that is capable of notifying and presenting the data to the user in real-time at the mobile device when data arrives at the host system.

By offering a wireless router 26, there may be a number of advantages to both the host system 250 and the wireless network 200 in accordance with various embodiments. The host system 250 in general runs a host service that is considered to be any computer program that is running on one or more computer systems. The host service is said to be running on a host system 250, and one host system 250 can support any number of host services. A host service may or may not be aware of the fact that information is being channeled to mobile devices 100. For example an e-mail or message program 138 (see FIG. 4) might be receiving and processing e-mail while an associated program (e.g. an e-mail wireless mobility agent) is also monitoring the mailbox for the user and forwarding or pushing the same e-mail to a wireless device 100. A host service might also be modified to prepare and exchange information with mobile devices 100 via the wireless router 26, like customer relationship management software. In a third example, there might be a common access to a range of host services. For example a mobility agent might offer a Wireless Access Protocol (WAP) connection to several databases.

Figure 2:
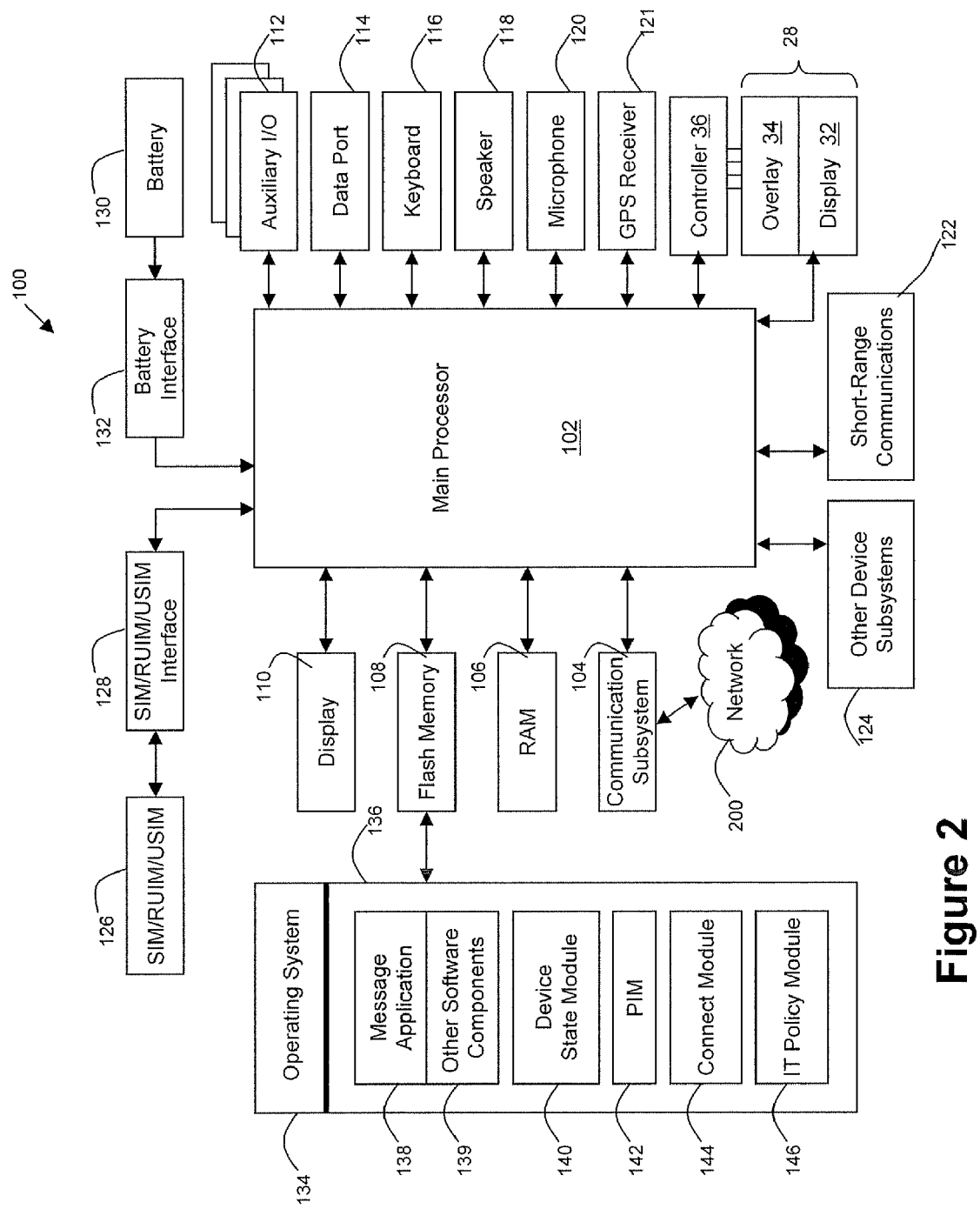
FIG. 2 is a block diagram of an exemplary embodiment of a mobile device.
Figure 3:
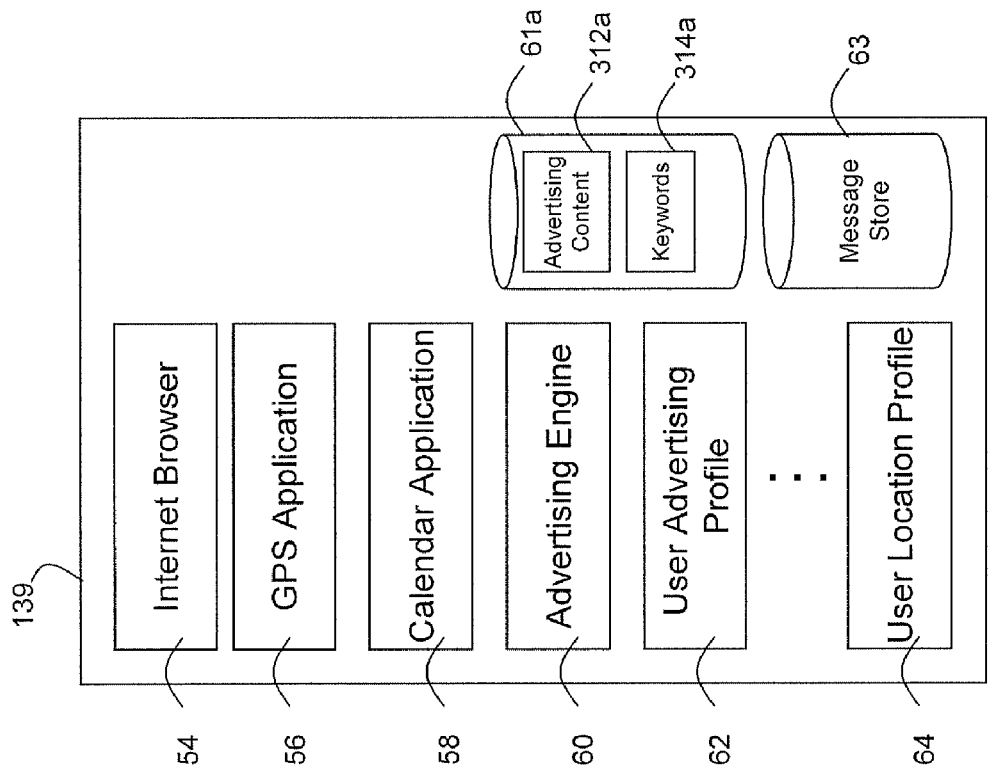
FIG. 3 is a block diagram illustrating exemplary other software applications and components shown in FIG. 2.

As discussed above, a mobile device 100 may be a handheld two-way wireless paging computer as exemplified in FIGS. 2-3, a wirelessly enabled palm-top computer, a mobile telephone with data messaging capabilities, a PDA with mobile phone capabilities, a wirelessly enabled laptop computer, a vending machine with an associated OEM radio modem, a wirelessly-enabled heart-monitoring system or, alternatively, it could be other types of mobile data communication devices capable of sending and receiving messages via a network connection. Although the system is exemplified as operating in a two-way communications mode, certain aspects of the system could be used in a "one and one-half" or acknowledgment paging environment, or even with a one-way paging system. In such limited data messaging environments, the wireless router 26 still could abstract the mobile device 100 and wireless network 200, offer push services to standard web-based server systems and allow a host service in a host system 250 to reach the mobile device 100 in many countries.

The host system 250 shown herein has many methods when establishing a communication link to the wireless router 26. For one skilled in the art of data communications the host system 250 could use connection protocols like TCP/IP, X.25, Frame Relay, ISDN, ATM or many other protocols to establish a point-to-point connection. Over this connection there are several tunneling methods available to package and send the data, some of these include: HTTP/HTML, HTTP/

XML, HTTP/Proprietary, FTP, SMTP or some other proprietary data exchange protocol. The type of host systems 250 that might employ the wireless router 26 to perform push could include: field service applications, e-mail services, stock quote services, banking services, stock trading services, field sales applications, advertising messages and many others. This wireless network 200 abstraction is made possible by the wireless router 26, which implements this routing and push functionality. The type of user-selected data items being exchanged by the host could include: E-mail messages, calendar events, meeting notifications, address entries, journal entries, personal alerts, alarms, warnings, stock quotes, news bulletins, bank account transactions, field service updates, stock trades, heart-monitoring information, vending machine stock levels, meter reading data, GPS data, etc., but could, alternatively, include any other type of message that is transmitted to the host system 250, or that the host system 250 acquires through the use of intelligent agents, such as data that is received after the host system 250 initiates a search of a database or a website or a bulletin board.

The wireless router 26 provides a range of services to make creating a push-based host service possible. These networks may comprise: CDMA (Code Division Multiple Access) networks, GSM (Groupe Special Mobile or the Global System for Mobile Communications) networks, GPRS (General Packet Radio Service) networks, and third-generation (3G) and fourth-generation (4G) networks including without limitation EDGE (Enhanced Data rates for GSM Evolution), UMTS (Universal Mobile Telecommunications System), HSDPA (High-Speed Downlink Packet Access), LTE (Long Term Evolution), WiMAX (Worldwide Interoperability for Microwave Access), etc. Some older examples of data-centric networks include, but are not limited to: the Mobitex Radio Network ("Mobitex") and the DataTAC Radio Network ("DataTAC").

To be effective in providing push services for host systems 250, the wireless router 26 may implement a set of defined functions. It can be appreciated that one could select many different hardware configurations for the wireless router 26, however, many of the same or similar set of features would likely be present in the different configurations. The wireless router 26 may offer any one or more of the following features for host services: 1) An addressing method so that mobile device 100 traffic can be addressed to a host system 250 without the need for the wireless network 200 to assign an identity to each host system 250; 2) An efficient and authenticated method for the host system 250 to initiate a communication connection to the wireless router 26 for the purposes of opening a communication tunnel to the one or more mobile devices 100 that the host system 250 wishes to communicate with; 3) A reliable method for exchanging data between the host system 250 and the mobile device 100, in a manner consistent with the abilities of the wireless network 200; 4) Providing feedback to the host system 250 when data is delivered, which allows the host system to clean up any wireless delivery queues if necessary, or inform the original sender (user or program) that the data has been delivered to the mobile device 100; 5) Implementation of a wireless network 200 initiated push of services or data to a mobile device 100, from a wireless router 26; and 6) Connecting to a wide range of wireless networks 200 and provide a way of tracking the user's location so that a "follow you anywhere" solution can be provided.

To aid the reader in understanding the structure of the mobile device 100 and how it communicates with the wireless network 200, reference will now be made to FIGS. 2 through 3.

Referring first to FIG. 2, shown therein is a block diagram of an exemplary embodiment of a mobile device 100. The mobile device 100 comprises a number of components such as a main processor 102 that controls the overall operation of the mobile device 100. Communication functions, including data and voice communications, are performed through a communication subsystem 104. The communication subsystem 104 receives messages from and sends messages to a wireless network 200. In this exemplary embodiment of the mobile device 100, the communication subsystem 104 is configured in accordance with the Global System for Mobile Communication (GSM) and General Packet Radio Services (GPRS) standards, which is used worldwide. Other communication configurations that are equally applicable are the 3G and 4G networks such as EDGE, UMTS and HSDPA, LTE, Wi-Max etc. New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 100 is not fully operational for communication with the wireless network 200. Once the SIM/RUIM/USIM 126 is inserted into the SIM/RUIM/USIM interface 128, it is coupled to the main processor 102.

The mobile device 100 is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 100 during its manufacture. Software applications may include a message application 138, a device state module 140, a Personal Information Manager (PIM) 142, a connect module 144 and an IT policy module 146. A message application 138 can be any suitable software program that allows a user of the mobile device 100 to send and receive electronic messages, wherein messages are typically stored in the flash memory 108 of the mobile device 100. A device state module 140 provides persistence, i.e. the device state module 140 ensures that important device data is stored in persistent memory, such as the flash memory 108, so that the data is not lost when the mobile device 100 is turned off or loses power. A PIM 142 includes functionality for organizing and managing data items of interest to the user, such as, but not limited to, e-mail, text messages, instant messages, contacts, calendar events, and voice mails, and may interact with the wireless network 200. A connect module 144 implements the communication protocols that are required for the mobile device 100 to communicate with the wireless infrastructure and any host system 250, such as an enterprise system, that the mobile device 100 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 100. These software applications 139 can be pre-installed applications (i.e. other than message application 138) or third party applications, which are added after the manufacture of the mobile device 100. Examples of third party applications include games, calculators, utilities, etc.

The additional applications 139 can be loaded onto the mobile device 100 through at least one of the wireless network 200, the auxiliary I/O subsystem 112, the data port 114, the short-range communications subsystem 122, or any other suitable device subsystem 124.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

For composing data items, such as e-mail messages, for example, a user or subscriber could use the touch-sensitive overlay 34 on the display 32 that are part of the touch screen display 28, in addition to possibly the auxiliary I/O subsystem 122. The auxiliary I/O subsystem 112 may include devices such as: a mouse, track ball, infrared fingerprint detector, or a roller wheel with dynamic button pressing capability. A composed item may be transmitted over the wireless network 200 through the communication subsystem 104.

FIG. 3 shows an example of some of the other software applications and components 139 that may be stored and used on the mobile device 100. Only a few representative examples are shown in FIG. 3 for illustrative purposes and such examples are not to be considered exhaustive. The reference numerals including the suffix "a" indicate that a similar element can also or instead be used at an intermediary as explained below. In this example, the mobile device 100 includes, stores and operates an Internet browser 54 for accessing the Internet through the wireless network 200, a GPS application 56 for obtaining GPS coordinates from the GPS receiver 121 for use with on-device map functions etc., and a calendar application 58 for storing appointments and contacts etc. The other applications 139 also include, in this example, an advertising engine 60, which, as will be described in greater detail below, examines incoming messages 300 or outgoing messages 300 or both for predetermined content that can be linked to advertising content 312a and access to such advertising content 312a inserted into the message thus creating a modified message 302 (see also FIGS. 4 and 5—explained below). The advertising engine 60 utilizes an advertising data store 61a, which stores the advertising content 312a and keywords 314a that are to be associated with the advertising content 312a. The advertising engine 60 also has access to a message store 63, which is a memory component that stores messages that are viewed, e.g. in the message application 138, or other applications such as instant messaging and text messages.

Also shown in FIG. 3 is a user advertising profile 62 and a user location profile 64. The advertising profile 62, which will be shown and explained in greater detail with reference to FIG. 8, contains user selected information to assist the advertising engine 60 in determining what content should be provided to the user and according to what criteria or preferences. As will be explained below, the advertising profile 62 contains information such as demographic and user-specified requests for certain content, and can be linked to the location profile 64. The advertising profile 62 can be used to filter messages 300 for advertising content either before it enters the message store 63a (i.e. at some intermediary) or on the mobile device 100 before it is linked to the keywords 314a during generation of the modified messages 302.

As such, the message store 63 can include messages 300 prior to modification, modified messages 302 or both. As will be explained in greater detail below, the advertising engine 60 may not be required in such cases where its role is provided by an advertising server 306 at an intermediary node 305 (see FIG. 4) and mobile device 100 receives only messages that are already modified or not modified at all, i.e. having gone through a filtering process at the intermediary node 305.

The location profile 64, shown also in FIG. 7 and described in greater detail below, contains user-specified information to assist in making location-based decisions for matching advertising content not only based on the keywords 314a, but also according to a particular user's preferences, i.e. to provide further context during the filtering process.

Figure 4:
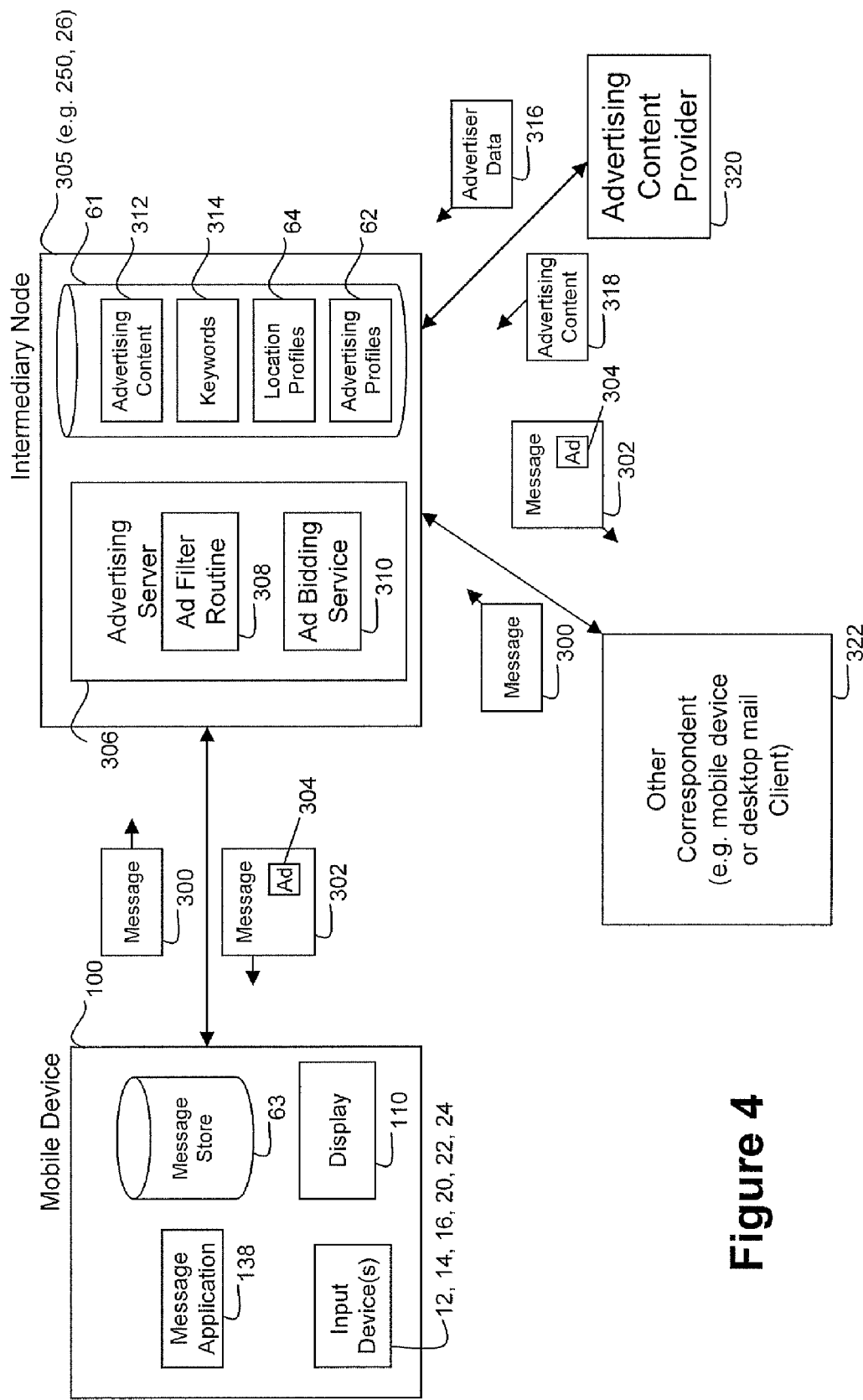
FIG. 4 is a system diagram showing one configuration for filtering message content and linking such message content to advertising content in accordance with one embodiment.

Turning now to FIG. 4, a first configuration is shown for incorporating advertising content 312 into messages (which may include incoming messages, outgoing messages 300, or both) addressed to a particular mobile device 100. This configuration comprises running an advertising server 306 at the intermediary node 305 to offload from the mobile device 100, the burden of filtering messages 300. It will be appreciated that the advertising server 306 may be implemented on any suitable device and thus may also be referred to as a "server device". As exemplified in FIG. 4, a suitable intermediary node 305 is the host system 250 or wireless router 26 described above. The intermediary node 305 may also be an ISP, third party web service, etc. Although only certain ones of the components of the mobile device 100 and intermediary node 305 are shown in FIG. 4, it will be understood that omission of other components, including those referenced in the examples below is for the sake of clarity only.

The mobile device 100, among other things, makes use in this example, of the message application 138, the message store 63, various input devices 12, 14, 16, 20, 22, 24 and the display component 110. The mobile device 100 in this example sends outgoing messages 300 in the usual manner, e.g. as discussed above, and receives modified messages 302 from the intermediary 305, which includes one or more layers of advertising content 312 that can be revealed using various advertising linking mechanisms 304. As will be exemplified below, the advertising linking mechanism 304 may comprise any suitable use of the advertising content 312, including hyperlinks, pop-ups, banners and other forms of advertising that may be incorporated into the message 302 and may be transparent to the user until certain criteria are met. The modified messages 302 are received, stored, accessed, displayed, and interacted with in the same way as a normal, unmodified message 300; however, they have additional features related to the advertising linking mechanisms 304 that can be utilized. It will be appreciated that the message application 138 in the following examples represents any message-based application including email, text messaging, multimedia messaging, peer-to-peer messaging, instant messaging, mobile teletypewriter (TTY) and any other communication from a sender to a recipient having message content that can be examined or scanned in relation to multimedia content such as advertising content so that the multimedia content can be linked to the message 300 through the message content, e.g. using a modified message 302.

The intermediary node 305 comprises the advertising server 306 and an advertising data store 61. The advertising data store 61 stores the advertising content 312, the keywords 314 used to link the advertising content 312 to message content, copies of the location profiles 64 for associated mobile devices 100 and copies of the advertising profiles 62 for same. The profiles 62, 64 may be obtained and updated at any time through communication with the mobile devices 100. The advertising server 306 comprises an advertising (ad) filter routine 308, which filters message content and links such message content to appropriate advertising content 312 based on the keywords 314, corresponding location profile 64 and corresponding advertising profile 62 for the mobile device 100 to which the message 300 being examined is addressed.

It may be noted that "keywords 314" used herein generally represents any collection of words, phrases or other predetermined criteria that can be used in a search or examination of the content of the message 300 to determine if any of such content is suitably associated with corresponding multimedia content such as the advertising content 312. As such, where more intelligent contextual searching techniques are used, exact matches of words may not be required, i.e. the context of a phrase or the entire message may be interpreted to determine suitable multimedia content, advertisements etc. For the sake of clarity, the following examples will make reference to keywords 314, and it will be understood that other predetermined criteria for the content in the message 300 may be examined.

The advertising server 306 also comprises an ad bidding service 310, which may be a hosted web service that advertising content providers 320 can access in order to bid on keywords 314. This enables the intermediary 305 to obtain more revenue for more popular words, phrases, products etc. to maximize the subsidies that can be obtained. Therefore, although only one advertising service provider 320 is shown in FIG. 4, it will be appreciated that typically many will be in communication with the intermediary node 305, in particular during a bidding process, which is explained in greater detail below.

The advertising content providers 320 provide original advertising content 318, which may or may not be in a form suitable for insertion into a message 300. In this example, it is assumed that original advertising content 318 is provided to the intermediary node 305, who then processes the original advertising content 318 to generate the message advertising content 312, which is then linked to the message 300 through the advertising linking mechanisms 304. The advertising content providers 320 may also provide advertiser data 316, e.g. billing information, profile information, bids etc. or any other information that establishes the relationship with the advertising server 306.

Also shown in FIG. 4 is an other correspondent 322, which may comprise another mobile device 100, a desktop or laptop computer having a mail client, or any other device or entity capable of preparing a message 300 of the format being handled by the message application 138. Similarly, the other correspondent 322 may receive modified messages 302 containing an advertising linking mechanism 304, e.g. for a message 300 sent by the mobile device 100 shown in FIG. 4 through the intermediary node 305.

In the configuration shown in FIG. 4, it can be appreciated that to enable the advertising server 306 to have access to the content of the message 300 for scanning and filtering purposes (the messages 300 typically being encrypted), some form of permission should be established, at least with one of the correspondents. Since the advertising server 306 is suitable for facilitating mobile advertising, when it is located at the intermediary node 305 as shown in FIG. 4, permission is suitably obtained from the mobile device users. Where the intermediary node 305 is a host system 250 or wireless router 26 or ISP, permission may be obtained when initiating a service agreement or upon subscribing to a mobile advertising service at a later time. Other issues of privacy and confidentiality can be handled by having the intermediary node 305 employ strict measures of protection or by storing personal information in an anonymous way. It may be noted that the configurations described herein enable the advertising content to be served to the mobile device 100 without disclosing any identifiable user data to the advertising content provider 320. For example, the advertising server 306 can indicate that the user is a male of a certain age with a certain income level but this would not be associated with sensitive information associated with the user such as a name and home address. The advertisements 304 may then be served to any user that fits a particular profile as dictated by the advertising content providers 320 without the advertising server 306 providing anything that would link that profile to a specific user, e.g. through a name, device identifier, etc.

As noted, although the following examples are given in the context of email type exchanges, the following principles may be equally applied to other types of messages 300, including without limitation text messages, multi-media messages, peer-to-peer messages, instant messages and mobile teletypewriter (TTY) messages, etc. It may also be noted that although they may be applied to exchange-type messages, the principles described herein can also be applied to other data such as local programs, web-based programs and any other data structure or element containing readable content that can be scanned and filtered for relevance in comparison to the advertising content 312. For example, the operations performed by the advertising server 306 described below can also be applied to word processing or document viewer applications and web pages.

Figure 5:
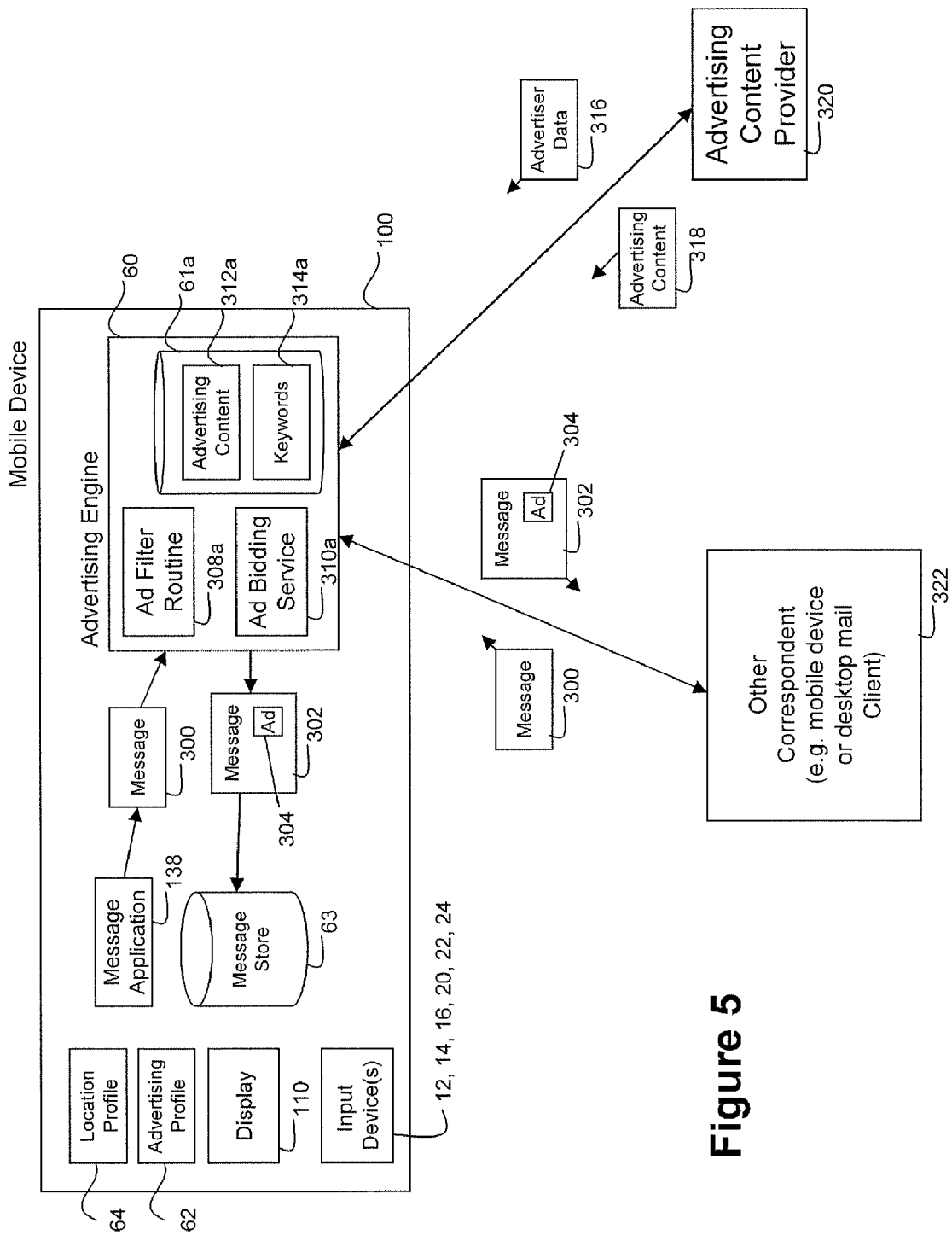
FIG. 5 is a system diagram showing another configuration for filtering message content and linking such message content to advertising content in accordance with one embodiment.

Turning now to FIG. 5, another configuration for generating a modified message 302 is shown. Where memory and processing capabilities permit, or to avoid privacy issues, or both, an advertising engine 60 may be located at the mobile device 100. It can be seen that the flow of data is similar to that shown in FIG. 4; however, the advertising content providers 320 would in this case communicate directly with the advertising engine 60 and thus directly with the mobile device 100 at least on a periodic basis. In FIG. 5, the other correspondent 322 is shown as communicating directly with the mobile device 100; however, it will be appreciated that where appropriate, such communications would be performed through the intermediary node 305. The omission of components such as the host system 250 and wireless router 26 is thus for the sake of clarity only and to illustrate that the mobile device 100, in the configuration shown in FIG. 5, may be capable of processing both incoming and outgoing messages in the same way that the advertising server 306 does in the configuration shown in FIG. 4.

For the configuration in FIG. 5, the mobile device 100 accesses its own location profile 64 and advertising profile 62 stored locally as illustrated in FIG. 7, and runs the advertising engine 60 locally. The advertising engine 60 comprises a mobile ad filter routine 308a and a mobile ad bidding service 310a. Although the mobile advertising data store 61a is illustrated in FIG. 5 as being included in the advertising engine 60 it will be appreciated that such data can be stored in any memory component on the mobile device 100. The advertising content 312a and keywords 314a are, in this example, tailored to the user of the mobile device 100 at some predetermined time, e.g. using the location and advertising profiles 64, 62 so that the advertising engine 60 can avoid filtering based on user preferences and location each time the incoming and outgoing messages 300 are scanned. In this way, processing power can be conserved and at least part of the filtering being done at appropriate times of lower processor usage.

The user location profile 64 is shown in greater detail in FIG. 7. As noted above, the user location profile 64 enables a user to specify location-based preferences so that advertising content 312 such as that related to weather, news, etc. can be tailored to certain locations. Since a user's physical location may not necessarily correspond to the relevant or desired location for the user, the user location profile 64 allows the user to customize advertising content for relevance. For example, although the user's physical location may be relevant for weather information, a user may wish to receive news articles that are local to where they live or work, regardless of their physical location. Another example pertains to language. A user travelling in Europe may presently be in France but live in Germany and thus may wish to receive only German-language advertisements, news and other content even when currently in France. The user location profile 64 may be used in connection with a mechanism for ascertaining the actual physical location of the mobile device 100, e.g. the GPS receiver 121 to enable the advertising content server 306 to associate certain content with geographical criteria.

Turning now to FIG. 7, several examples of suitable user preference options are shown. In this example, the user can select and distinguish between a default location 311 and an override location 314. The default location 311 can be used to specify a location to be associated with the user if no other information is available. The override location can be used to override other mechanisms for estimating physical location and other preferences. An example of a use for the default location 311 would be for the user to specify their home city or where they work, i.e. a place where they spend a significant amount of time and thus sporting events, concert tickets and other promotions would likely be of interest to them. An example of a use for the override location 314 would enable a user to override more relevant information and direct it to the specified city. In this way, a user that is travelling may wish to only receive weather reports for their home city even though they are experiencing different weather in their physical location. Any other motivation can form the basis for specifying an override or default at the user's discretion. As can be seen, when displayed in a user interface (UI), the location profile 64 can include ON/OFF toggle buttons 303 to enable the user to turn the associated feature on or off as well as input boxes 313 to specify the desired location. As also shown in FIG. 7, the user can specify whether or not they may be prompted to provide their location by turning a user input prompt option 301 to be "ON" or "OFF".

The user location profile 64 can also allow the user to specify a location 316 for a number of different categories 315. The examples given in FIG. 7 include entertainment, weather, sports, news and language categories 315 and illustrate several input mechanisms to allow the user to conveniently set and modify their preferences. These include input boxes 317, multi-choice buttons 318 with different regional preferences, and multi-choice buttons 319 showing available languages. It will be appreciated that the categories 315 and selection mechanisms 312, 313, 317, 318, 319 shown in FIG. 7 are for illustrative purposes only and that any suitable UI components can also be used in addition to or instead of those shown. In general, the location profile 64 allows the advertising content server 306 to filter the available content based on user preferences to provide a more relevant set of advertisements to be incorporated into the message 300.

Reference will now be made to FIG. 8, which includes an example user advertising profile 62, which may also be used to perform further filtering of the initial list of keywords 326 (see also FIG. 6) identified by the scanning function 325. The user advertising profile 62 allows the user to assist the advertising content server 306 in filtering the advertising content 312 so that the keywords 314 found in the scan 325 are more relevant to the user. The user advertising profile 62 can include any suitable information and can be constructed using any suitable data structure and populated using any suitable UI or input mechanism. In FIG. 8, it can be seen that demographic data 320 is maintained that includes data such as age, gender, nationality and any other data that the user is willing to provide. The advertising profile 62 also includes a linking option 321, which allows the advertising profile 62 to utilize the location profile 64 for location-based user data. If the user wants to specify different or additional location-based options, they may select a Custom button 322 and enter such data manually. The user advertising profile 62 also includes a content log 323 which can be used to indicate items that the user has already viewed or would not likely be interested in. For example, advertisements for a particular game may be overlooked because the content log 323 indicates that the user has already obtained that game for their mobile device 100. As such, the content log 323 can combine both user input and can gather, track and record usage data as desired. The advertising profile 62 may also include user request data 324 that specifies certain content that the user wishes to see or any other requests or preferences that the user wishes to specify. It can be seen that the advertising profile 62 provides a mechanism to enable the user to contribute to the content filtering process, which benefits the advertising content providers 320, since they can be more confident in the likelihood that the advertising content 312 provided will be well received.

Figure 6:
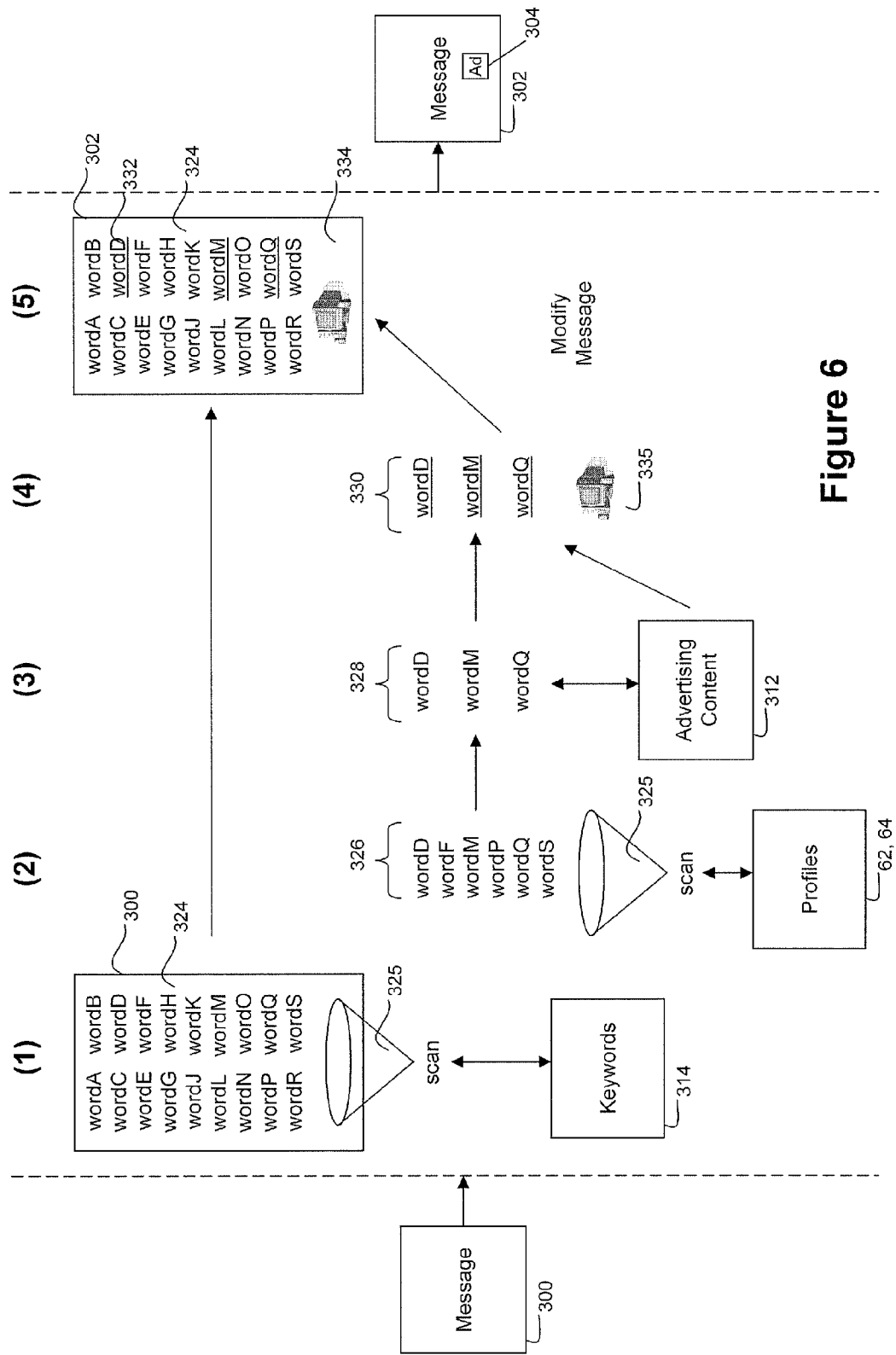
FIG. 6 is a flow diagram illustrating one embodiment for linking message content to advertising content to produce a modified message providing access to the advertising content in accordance with one embodiment.

As noted above, the advertising server 306 and advertising engine 60 operate to examine, scan, filter and apply advertising linking mechanisms 304 to incoming and outgoing messages 300 to generate the modified messages 302. FIG. 6 illustrates one example for generating a modified message 302. Prior to step (1), the advertising server 306 or advertising engine 60 obtains the message 300, either as it arrives or from the message store 63 at a predetermined time or based on a predetermined interval. At step (1), the message body 324, which in general contains words, phrases and other textual information, is examined or scanned using a scanning function 325. The scanning function 325 generally includes any search or find operation that can be used to examine words or phrases or both and match those to the available keywords 314. As noted above, the term "keyword" is used in a general sense to represent any textual or contextual data, which may include individual words, characters, combinations of characters, phrases, sentences, paragraphs and other groups of textual data as well as more intelligent contextual information. The message content 324 shown in FIG. 6 is provided for illustrative purposes only and for clarity. As such, "wordA", "wordB" etc. may represent any of the above noted forms of textual or contextual data or other portion of the content of the message 300.

At step (2) an initial list of keywords 326 generated from the scanning function 325 performed in step (1) is then scanned again for relevance using the profiles 62, 64. The additional scan 325 can be an optional step, in particular depending on the number of items identified in the initial scan 325 and the availability of good profile data. In some cases, a lower limit may be placed on the initial list of keywords 326 such that if fewer than a predetermined number of items are identified, the additional scan 325 in step (2) is not needed. This enables the advertising server 306 and advertising engine 60 to meet the needs of both the users and the advertising content providers 320 by avoiding over-filtering. The second scan 325, if performed, produces a final list of keywords 328. It can be seen that the number of items in the initial list 326 was in this example trimmed in half. Given that the keywords 314 are already associated with the advertising content 312, the advertising content 312 that is associated with the keywords in the final list 328 is then linked to the keywords in the final list 328 in step (3), using a linking mechanism that, when selected, reveals the corresponding multimedia content that in this example is embodied as an advertisement. There are various ways in which to link the advertising content 312 to the final list of keywords 328, examples of which are described below. Such linking may effectively generate another layer to the message 300 that can be accessed according to the user's interactions and at their discretion. To avoid overwhelming the modified message 302 with too many linking mechanisms, the additional scan may include determining if the number of items in the final list 328 is higher than a predetermined maximum threshold, in which case lower priority matches can be discarded. To determine priority, certain ones of the keywords 314 can be given a weight based on how valuable the keyword 314 is to the corresponding advertiser, i.e. how much revenue can be obtained from that keyword 314. Any other additional filtering can be done to reduce the final list 328 to an acceptable level, such as by giving a rotating priority so that keywords 314 are discarded equally over time.

In step (4), the final list of keywords 328 is processed by, in this example, hyperlinking 332 each keyword to generate a list of hyperlinks 330 to be applied to the corresponding text in the message body 324. It can be appreciated that the filtering process is illustrated only conceptually in FIG. 6 and that the items shown in the lists of keywords 326, 328 and 330 would not necessarily be extracted from the message 300. In this example, step (4) also comprises adding another advertising linking mechanism 304, namely a visual advertising element 335. In step (5), the message is modified by hyperlinking 332 the text identified in the list 330 and adding the visual advertising 335 to the end portion 334 of the message 300 thus producing the modified message 302. It can be seen that the advertising linking mechanisms 304 in this example comprise hyperlinks and visual advertising 335 such as a banner ad. To avoid disrupting the message content 324, the visual advertising 335 may be placed at the bottom of the modified message 302. It will be appreciated that the visual advertising 335 can also be placed at the top of the modified message 302 or along one or both of the left/right margins, e.g. to be revealed when using a horizontal scrolling operation. The visual advertising 335 can be associated with the hyperlinks 332 or can be independent and based on other information. For example, the visual advertising 335 can be used to provide relevant advertisements based on the user profiles 62, 64 only or to provide sponsored ads that the user agrees to have included as part of the subsidy agreement.

Turning now to FIGS. 9(a) to 9(c), various examples of the modified message 302 are shown. In FIG. 9(a), the modified message 302a is similar to that shown in FIG. 6, namely by including both hyperlinking 332 and visual advertising 335. Also shown is other advertising content 337, which may include text, other hyperlinks 332, audio controls etc.; and may or may not be associated with the visual advertising 335. It can be seen that the bottom portion 334 of the modified message 302a can be designated as advertising space. Since the bottom portion 334 is only seen once the user scrolls through the entire message body 324, the original user task of reading the message content 324 is not disrupted. FIG. 9(b) shows an alternative embodiment wherein only hyperlinking 332 is used. This embodiment is less invasive in that the modified message 302b is only visually different from the original message 300, by the presence of hyperlinks 332 and thus the entire advertising content 312 for this modified message 302b is in a transparent layer that is only accessed and shown when initiated by the user. The embodiment shown in FIG. 9(b) may be used as a minimum service corresponding to a lesser subsidy than those users agreeing to include the visual advertising 335 and other advertising content 337 shown in FIG. 9(a). FIG. 9(c) shows another embodiment, wherein hyperlinks 332 are not used, and only visual advertising 335 and other advertising content 337 are inserted in the bottom portion 334. It may be noted that in generating the modified message 302c, the steps shown in FIG. 6 can still be used minus the generation of hyperlinks 332 in steps (4) and (5). The same principles of scanning against keywords 314 and scanning against profiles 62, 64 may thus be used with or without the provision of hyperlinking 332. It can therefore be seen that may variations and combinations of advertising linking mechanisms 304 can be employed.

It may be appreciated that by linking the advertising content 312 to portions of the message body 324, and creating a transparent or hidden layer of advertisements, situations may arise where the user either intentionally or inadvertently bypasses or otherwise does not see the advertising content 312. One example is where the user closes the message 302c before reaching the bottom portion 334 as shown in FIG. 10(a). Situations such as these may be of a concern to the advertising content providers 320 since they are not guaranteed that the user is exposed to the advertisement. In order to ensure that the advertising content 312, e.g. visual advertising 335 and other advertising content 337, is seen for at least a predetermined minimum period of time, an advertising blip 334a can be utilized as shown in FIG. 10(b). In general, FIG. 10(b) illustrates a method for displaying advertising content included in a message on a mobile device comprising enabling selection of the message from within a message application; enabling the message to be displayed; upon sensing the message being closed, determining if the advertising content has been viewed according to predetermined criteria; if the predetermined criteria have not been met, displaying the advertising content for a predetermined period prior to resuming screen control with the message application.

Turning now to FIG. 10(b), the advertising blip 334a would be flashed on the display 12 subsequent to the user selectively closing the message 302c under certain conditions. For example, if the advertising engine 60 (or message application 138 in FIG. 4 configuration) detects that the advertising content 312 in the bottom portion 334 of the message body 324 did not appear on the display 12, i.e. was never seen by the user, the advertising blip 334a may then be triggered. The advertising blip 334a can be a separate data element or may require the processor 121 to copy the relevant portion of the data (from the bottom portion of the message 334) only as necessary. Screen control is used to display the advertising blip 334a after the modified message 302c has been closed but before normal screen control returns to the message application inbox 336 as shown in FIG. 10(c). In this way, regardless of how long and to what extent the user actually scrolls through the message 302c, the advertising content 335, 337 may be given a minimum amount of screen time, i.e. according to the length of the blip 334a. Other conditions may cause the blip 334a to appear, such as when the bottom portion 334 of the message 302c is not viewed for long enough. For example, if the user tries to scroll to the bottom of the message 302c to bypass the blip 334a, if the content 335, 337 is not shown for a specified minimum amount of time, the blip 334a may be launched, even though the advertising content 335, 337 did appear on the display 12. It will be appreciated that the same mechanism can be used to display advertising content 312 associated with a hyperlink 332, pop-up or other advertising linking mechanism 304 and should not be limited to only the example shown in FIGS. 10(a) to 10(c). In general, the mechanism exemplified in FIGS. 10(a) to 10(c) detects whether or not certain advertising content 312 has been viewed according to minimum criteria and if not, takes over screen control to display the advertising blip 334a containing the advertising content 312 that was overlooked.

FIGS. 11(a) to 11(c) illustrate various ways in which the advertising linking mechanisms 304 can be revealed through user interaction. As discussed above, the modified messages 302 should be generated in a way that minimizes distractions within the message body 324 thereby minimizing the potential nuisances for the user. This can be achieved by hiding the advertising content 312 in a transparent layer wherein certain user interactions can cause the advertising linking mechanisms 304 to reveal the advertising content 312. Different user actions may be used to cause the advertising content 312 to be revealed, according to the cues provided to the user, e.g. hyperlinks 332 versus visual advertising 335.

As shown in FIG. 11(a), in step (1), the user moves a cursor 338 or other positioning indicator over the hyperlink 332 associated with wordD. This may then trigger a tag 340 to be displayed with the hyperlink 332 to indicate further advertising content 312 that can be accessed by selecting the hyperlink 332 in step (2a). In the example shown, the tag 340 includes a website address thus indicating a website that would be loaded if the user happens to select the highlighted hyperlink 332. It will be appreciated that the tag 340 may also contain descriptive text pertaining to the additional advertising content 312. For example, rather than hyperlinking 332 to a website, visual advertising 335 may be loaded and inserted. In this way, visual advertising 335 and other advertising content 337 may remain hidden until the user selects a hyperlink 332 rather than be automatically inserted in the message body 324. In another example, the additional advertising content 312 may simply be stored in the advertising data store 61 until the hyperlink 332 is selected.

Another option shown in FIG. 11(a) is to initiate a click-through at step (2b) by clicking on or otherwise selecting a certain portion or region of the content contained in the bottom portion 334 of the message 302a. In this way, the additional advertising content 312 may be embodied as any amount of additional information such as webpage loaded through the Internet browser 54 as indicated by step (3b).

Turning back to step (2a), FIGS. 11(b) and 11(c) illustrate two options for loading the additional advertising content 312 upon selection of the hyperlink 332 indicated by step (3a). In FIG. 11(b) it can be seen that the Internet browser display 342 is launched and screen control passed to the Internet browser 54 such that the user's focus is taken to the advertiser's webpage 344. In FIG. 11(c), an Internet browser portal 342a is instead launched directly within the message application 138 such that the user's focus may return immediately to the message 302a upon closing the portal 342a. The portal 342a may contain a resized Internet browser display 344a that comprises the same content as would be displayed in the variation shown in FIG. 11(b), similar to a pop-up advertisement. It can be seen that various levels of screen control can be used to redirect the user to the additional advertising content 312. Which option is used can be chosen based on user preferences, advertiser preferences or both.

FIG. 12 illustrates yet another option for providing the additional advertising content 312 upon sensing the presence of a cursor or other selection mechanism near or "hovering" over the hyperlink 332. As above, in step (1), the cursor 338 is moved over the hyperlink 332. In this option, rather than providing a tag 340, a pop-up advertisement 346 is displayed along with the hyperlink 332. The pop-up advertisement 346 is particularly suitable when used with modified messages 302b which do not include any visual advertising 335. In this way, the visual advertising 335 (and other advertising content 337) is readily available from the transparent layer by simply highlighting (or selecting) the hyperlink 332. It may be noted that the pop-up advertisement 346 can also be configured to enable a click-through to be initiated by the user to enable additional advertising content 312 to be displayed, e.g. in one or more of the ways shown in FIG. 11. It can therefore be seen that more than two layers of advertising content 312 can be hidden with each additional layer being initiated by user interactions. This can enable advertising content providers 329 to allow the users to preview the advertising content 312 (e.g. per FIG. 12) before deciding to click-through (e.g. per FIG. 11). The user may also benefit from such layering as they are less likely to be annoyed by advertising content 312 if it is they who choose to reveal the advertising content 312 through their own curiosity and subsequent interactions.

Turning now to FIG. 13, a method for generating the modified message 302 is shown. At 500, the advertising server 306 or advertising engine 60 obtains the unaltered message 300. This can be either incoming or outgoing messages 300. At 502, the message 300 is scanned against the keywords 314, e.g. as shown in FIG. 6, step (1). From this scanning operation, the initial list of matched keywords 326 is generated at 504. The advertising server 306 or advertising engine 60 then determines if either one or both of the profiles 62, 64 are to be used for further filtering at 506. As noted above, this determination can be affected by the number of items in the initial list 326 or user preferences or both. If the profiles 62, 64 are to be used, the initial list 326 is scanned 325 against the profiles 62, 64 at 508, e.g. as shown in FIG. 6, step (2). From this second scanning operation, a final list of matched keywords 328 is generated at 510. As can be seen, if the profiles 62, 64 are not to be used, the final list 328 would be the same as the initial list 326. The advertising server 306 or advertising engine 60 then determines if hyperlinks 332 are to be added at 512. If so, the hyperlinks 332 are added to the keywords indicated in the final list 338 to generate the hyperlinked list 330 at 514. If not, or following the hyperlinking operation, the advertising server 306 or advertising engine 60 then determines if other advertising linking mechanisms 304 are to be used at 516. This may include the visual advertising 335 and other advertising content 337. If other advertising linking mechanisms 304 are to be used, the message-sized advertising content (e.g. per FIGS. 9-11) are obtained at 518. If the other advertising linking mechanisms 304 are not to be used (e.g. message 302b) or once the message-sized advertising content is obtained, the message 300 is then modified accordingly at 520 to generate the modified message 302, which is then provided, e.g. sent or stored at 522.

Figure 14:
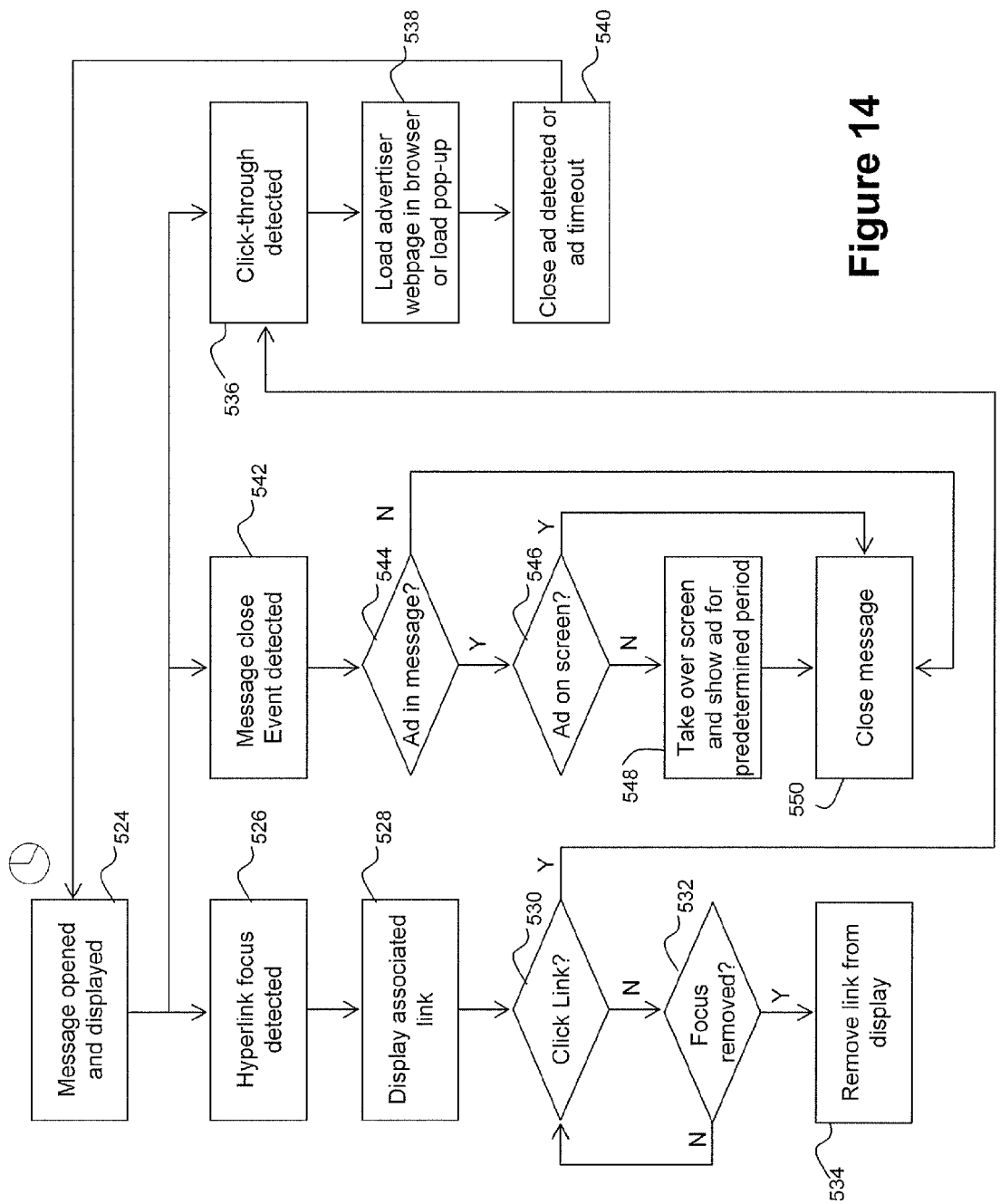
FIG. 14 is a flow diagram illustrating operations performed in response to various events detected or determined while viewing the modified message in accordance with one embodiment.

FIG. 14 illustrates a series of operations that may be performed according to user interactions detected or determined while the modified message 302 is opened and displayed, e.g. per FIGS. 10-12. In FIG. 14, the timer next to 524 indicates that the message 302 will remain open until certain conditions are met, in particular upon sensing a message close event at 542 indicating that the user has opted to close the message 302. At 526, a hyperlink focus event is detected or determined, wherein, e.g. the cursor 338 is on a hyperlink 332 as shown in FIGS. 11 and 12. In this example, upon detecting a focus being placed on the hyperlink 332, the link associated with the hyperlink 332 is displayed at 528. This may include displaying the tab 340 or the pop-up 346 or any other mechanism. It may be noted that either the message application 138 or the advertising engine 60 can be configured to detect the events exemplified in FIG. 14. This may depend on which configuration is used (e.g. FIG. 4 vs. FIG. 5) or may be application specific. For this example, it will be assumed that the message application 138 is responsible for triggering the advertising linking mechanisms 304. At 530, the message application 138 then determines if the link has been selected. If the link has been selected, the message application 138 determines that a click-through has been detected at 536, as explained below. If the link has not been selected at 530, the message application 138 then determines if the focus has been removed at 532, i.e. the hyperlink 332 was highlighted for a brief period but this condition no longer exists. If the focus has not been removed, the associated link, e.g. tag 340, will remain on the display 12. If the focus has been removed, the link is removed from the display at 534 and the message application 138 then returns to 524 and waits for the next event to be detected.

As noted above, a click-through event being detected at 536 may occur through a link such as the tag 340 or pop-up 346. The click-through event may also be detected at 536 independent of a hyperlink 332, e.g. by selecting visual advertising 335 or other advertising content 337 if applicable. Once a click-through is detected, the advertiser web-page 344 is loaded in the Internet browser display 342 or through the pop-up 344a as shown in FIGS. 11(b) and 11(c) at 538. The user then has control over the web-page 344 or pop-up 344a and this would persist until the ad is closed or after a predetermined amount of time elapses at 540. The message application 138 may then return to 524 until another event is detected.

A message close event may be detected at 542. As discussed above, the message close event may trigger the message application 138 to determine if the advertising content 312 has been viewed before actually handing screen control back to the user. At 544, the message application 138 determines if there is appropriate advertising content in the message 302. For example, if there is no visual advertising 335, the user may be allowed to simply close the message 302 at 550. If there is advertising content 312 or some other rule that enforces screen control such as use of the blip advertisement 334a shown in FIG. 10(b), the message application 138 then determines if the advertising content 312 has been viewed or given enough screen time at 546. This determination may be made according to predetermined thresholds or other criteria established with the user or the advertising content provider 320 or both. If the advertising content 312 has been given enough screen time, the message application 138 closes the message 302 at 550. If not, screen control may be given to the advertising content 312, e.g. by way of the blip ad 334a for a predetermined period of time at 548. When the predetermined period of time elapses, the message 302 can then be closed at 550.

As noted above, the advertising server 306 or advertising engine 60 in one embodiment comprises the ad bidding service 310, which enables the advertising content providers 320 to bid on certain keywords 314. The bidding service 310 can be used to obtain more revenue for some keywords 314 by promoting competition or may be used to simply determine appropriate advertising content providers 320 for the keywords 314 according to user profiles 62, 64, user preferences, demographics or any combination of parameters. As such, the bidding service 310 may enable the same keywords 314 to be linked to different advertising content providers 320 depending on such other parameters. For example, the keyword "football" having different meanings in the United States than in Europe may have different advertising content 312 linked thereto according to geography.

Figure 15:
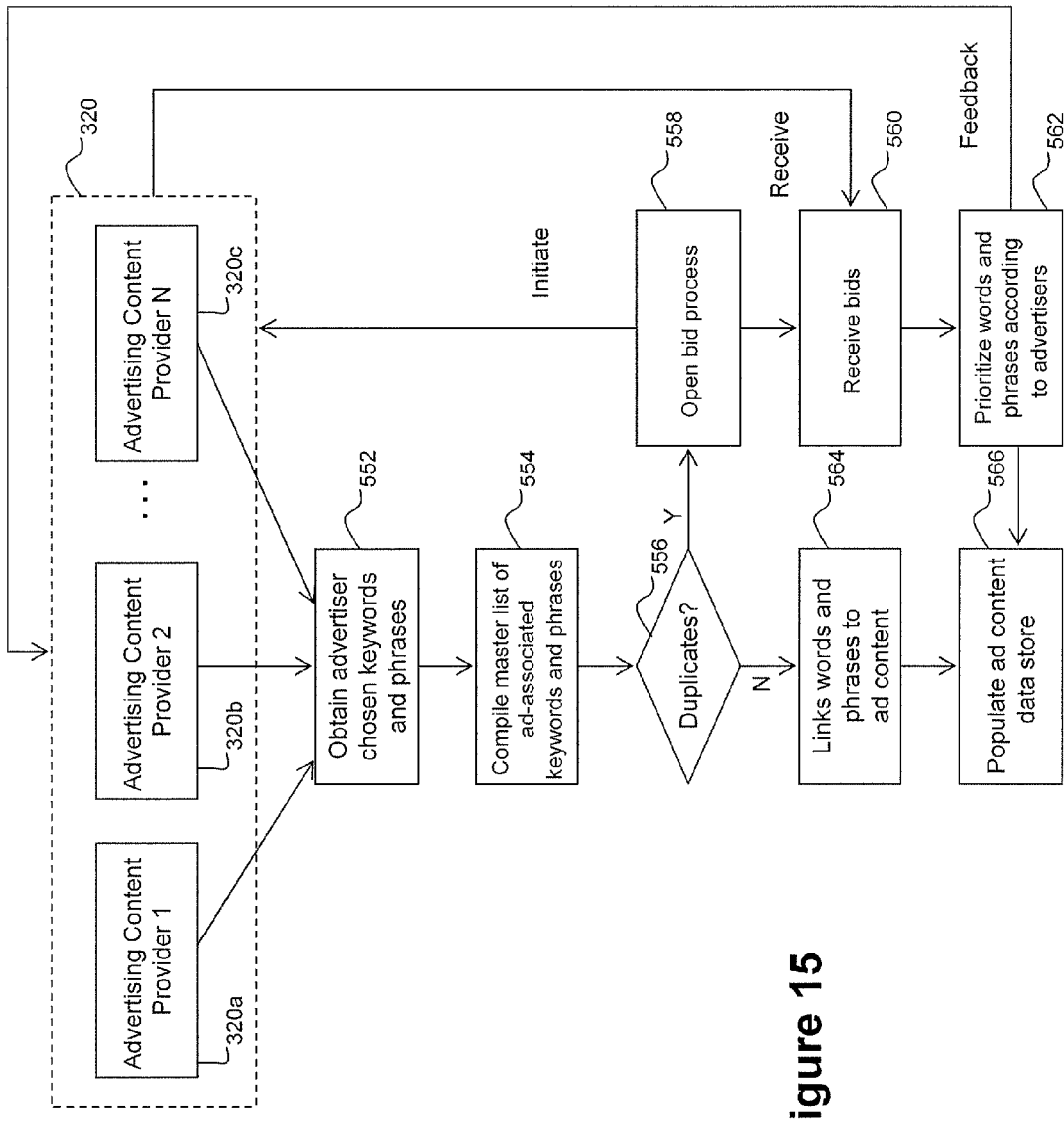
FIG. 15 is a flow diagram illustrating a method for enabling advertising content providers to bid on keywords and phrases to be associated with corresponding advertising content in accordance with one embodiment.

Turning now to FIG. 15, one example of a method for operating the bidding service 310 is shown, which enables the advertising server 306 to auction certain keywords or phrases when multiple advertising content providers 320 are interested in the same content. As can be seen, N advertising content providers 320 may participate and three are shown, namely Provider 1 320a, Provider 2 320b and Provider N 302c. At 552, the bidding service 310 obtains the advertiser chosen keywords and phrases and other information, e.g. by receiving advertiser data 316. This may be done in a dynamic setting or accumulated over time with scheduled bidding sessions initiated at set times. At 554, the bidding service 310 compiles a master list of keywords 314 that have advertising content 318 associated therewith. It may be noted that if the advertising content providers 320 all request different words or phrases, there would be no need to initiate a bidding process, since there would be no competing bids. Thus at 556, the bidding service 310 determines if there are duplicate keywords being requested. If not, the words and phrases provided are simply associated with the provided advertising content 318 at 564 as requested and the advertising content 312 suitable for the mobile device 100 is added to the data store 61 at 566. If there are duplicates at 556, the bidding process is opened at 558. Alternatively, the bidding service 310 may post predetermined keywords to limit the variation in advertising content and to avoid inconsistent terminology between content providers 320 etc. In such an alternative, the bidding service 310 would still look for duplicates; only the likelihood thereof would likely be greater.

The bid process 558 would then involve notifying the advertising content providers 320, e.g. by sending an email, text message or through some other form of communication, which then initiates the receipt of bids at 560. Based on the received bids, the bidding service 310 may then hold further rounds of bidding and match keywords 314 to the highest bidders and if necessary prioritize at 562. For example, rules may be employed wherein if an adverting content provider 329 is the highest bidder on multiple keywords 314 in the same message 300, only one of the keywords 314 is associated with that advertising content provider 329 according to a specified priority. This may be done to ensure that the modified message 302 contains a variety of advertising content 312 rather than overwhelm the message 302 with one type or category of advertisement. Upon determining the associations and priorities at 562, feedback may be sent to the advertising content providers 320 so that they are aware of the outcome of the bidding process.

It can therefore be seen that multimedia content can be incorporated into a message handled by a mobile device with minimum invasiveness by utilizing linking mechanisms that are visually identifiable with certain content and can reveal the multimedia content, e.g. an advertisement, upon selection. As exemplified above, this may be done by examining content in the message handled by a mobile device and matching portions of the message with predetermined criteria such as keywords or phrases. Upon finding matches, corresponding multimedia content is associated with a respective portion of the message content and access to the multimedia content is enabled through selection of a linking mechanism that is visually identifiable with the respective portion of the message. The message is modified to include such linking mechanisms such that upon viewing the modified message, a user may reveal the multimedia content by selecting the linking mechanism. It can also be seen that multiple layers of multimedia content can be provided such that different types of user interaction can reveal different forms of multimedia content. As discussed, the methods, systems and computer readable media for implementing the above are particularly suitable for incorporating advertising content into mobile communications.

It will be appreciated that the particular options, outcomes, applications, screen shots and icons shown in the figures and described above are for illustrative purposes only and many other variations can be used according to the principles described.

Although the above has been described with reference to certain specific embodiments, various modifications thereof will be apparent to those skilled in the art as outlined in the appended claims.

The invention claimed is:

1. A method for incorporating multimedia content into messages handled by a mobile device, said method comprising:
   obtaining a message being exchanged between said mobile device and one or more other entities in a data communication system;
   examining content in said message to determine if one or more portions of said content in said message match predetermined criteria related to the relevance of said content to multimedia content;
   using one or more profiles associated with a user of said mobile device to determine if the number of matches can be reduced according to the relevance of respective ones of said matches to said user and, if so, removing one or more of said matches;
   for each match, identifying particular multimedia content to be associated with the corresponding one of said one or more portions of said message, said multimedia content configured to be accessible to said mobile device through a selection associated with said corresponding one of said one or more portions of said content; and
   modifying said message to include, for each match, a linking mechanism visually identifiable with said corresponding one of said one or more portions, wherein said linking mechanism is configured to reveal said particular multimedia content upon selection thereof.

2. The method according to claim 1 wherein said multimedia content comprises advertising content.

3. The method according to claim 1 wherein said predetermined criteria comprises keywords or phrases.

4. The method according to claim 3 wherein said linking mechanism comprises a hyperlink applied to corresponding ones of said keywords or phrases.

5. The method according to claim 1 wherein the method is performed at said mobile device.

6. The method according to claim 1 wherein the method is performed at an intermediary node wherein said modifying occurs on incoming messages prior to being received by said mobile device and occurs on outgoing messages subsequent to being sent by said mobile device.

7. The method according to claim 1 wherein said message is any one or more of an email message, a text message, a multi-media message, a peer-to-peer message, an instant message or a mobile TTY message.

8. The method according to claim 1 wherein said modifying comprises incorporating additional multimedia content in said message that is visible in said message.

9. The method according to claim 8 further comprising wherein upon detecting that said message has been closed, if said additional multimedia content has not been viewed according to predetermined criteria, displaying said additional multimedia content for a predetermined period.

10. The method according to claim 1 further comprising incorporating multiple layers of multimedia content by enabling one layer of multimedia content to be displayed when a focus is placed on said portion and enabling another layer of multimedia content to be displayed upon selection of said linking mechanism or upon selection of said one layer of multimedia content.

11. A non-transitory computer readable medium comprising computer executable instructions for incorporating multimedia content into messages handled by a mobile device or a server device, comprising instructions for:
   obtaining a message being exchanged between said mobile device and one or more other entities in a data communication system;
   examining content in said message to determine if one or more portions of said content in said message match predetermined criteria related to the relevance of said content to multimedia content;
   using one or more profiles associated with a user of said mobile device to determine if the number of matches can be reduced according to the relevance of respective ones of said matches to said user and, if so, removing one or more of said matches;

for each match, identifying particular multimedia content to be associated with the corresponding one of said one or more portions of said message, said multimedia content configured to be accessible to said mobile device through a selection associated with said corresponding one of said one or more portions of said content; and modifying said message to include, for each match, a linking mechanism visually identifiable with said corresponding one of said one or more portions, wherein said linking mechanism is configured to reveal said particular multimedia content upon selection thereof.

12. A mobile device comprising a display, one or more input mechanisms, a processor, a message application and a memory, said memory storing computer executable instructions for incorporating multimedia content into messages handled by said message application, said instructions including instructions for:

obtaining a message being exchanged between said mobile device and one or more other entities in a data communication system;

examining content in said message to determine if one or more portions of said content in said message match predetermined criteria related to the relevance of said content to multimedia content;

using one or more profiles associated with a user of said mobile device to determine if the number of matches can be reduced according to the relevance of respective ones of said matches to said user and, if so removing one or more of said matches;

for each match, identifying particular multimedia content to be associated with the corresponding one of said one or more portions of said message, said multimedia content configured to be accessible to said mobile device through a selection associated with said corresponding one of said one or more portions of said content; and modifying said message to include, for each match, a linking mechanism visually identifiable with said corresponding one of said one or more portions, wherein said linking mechanism is configured to reveal said particular multimedia content upon selection thereof.

13. The mobile device according to claim 12 wherein said multimedia content comprises advertising content.

14. The mobile device according to claim 12 wherein said predetermined criteria comprises keywords or phrases.

15. The mobile device according to claim 14 wherein said linking mechanism comprises a hyperlink applied to corresponding ones of said keywords or phrases.

16. The mobile device according to claim 12 wherein said message is any one or more of an email message, a text message, a multi-media message, a peer-to-peer message, an instant message or a mobile TTY message.

17. The mobile device according to claim 12 wherein said modifying comprises incorporating additional multimedia content in said message that is visible in said message.

18. The mobile device according to claim 17 further comprising wherein upon detecting that said message has been closed, if said additional multimedia content has not been viewed according to predetermined criteria, said mobile device is configured for displaying said additional multimedia content for a predetermined period.

19. The mobile device according to claim 12 further configured for incorporating multiple layers of multimedia content by enabling one layer of multimedia content to be displayed when a focus is placed on said portion and enabling another layer of multimedia content to be displayed upon selection of said linking mechanism or upon selection of said one layer of multimedia content.

20. A server device for incorporating multimedia content into a message handled by a mobile device, said server device comprising a memory storing computer executable instructions for:

obtaining a message being exchanged between said mobile device and one or more other entities in a data communication system;

examining content in said message to determine if one or more portions of said content in said message match predetermined criteria related to the relevance of said content to multimedia content;

using one or more profiles associated with a user of said mobile device to determine if the number of matches can be reduced according to the relevance of respective ones of said matches to said user and, if so, removing one or more of said matches;

for each match, identifying particular multimedia content to be associated with the corresponding one of said one or more portions of said message, said multimedia content configured to be accessible to said mobile device through a selection associated with said corresponding one of said one or more portions of said content; and modifying said message to include, for each match, a linking mechanism visually identifiable with said corresponding one of said one or more portions, wherein said linking mechanism is configured to reveal said particular multimedia content upon selection thereof.

21. The method according to claim 1 further comprising enabling providers of said multimedia content to bid on said predetermined criteria.

22. The method according to claim 1 further comprising limiting a number of said linking mechanisms in said message according to a predetermined maximum threshold.

23. The method according to claim 22 wherein said limiting comprises discarding lower priority matches.

24. The method according to claim 1 wherein said one or more profiles are used only if the number of matches is greater than a predetermined number.

25. The mobile device according to claim 12 further comprising instructions for limiting a number of said linking mechanisms in said message according to a predetermined maximum threshold.

26. The mobile device according to claim 25 wherein said limiting comprises discarding lower priority matches.

27. The mobile device according to claim 12 wherein said one or more profiles are used only if the number of matches is greater than a predetermined number.

28. The server device according to claim 20 wherein said multimedia content comprises advertising content.

29. The server device according to claim 20 wherein said predetermined criteria comprises keywords or phrases.

30. The server device according to claim 29 wherein said linking mechanism comprises a hyperlink applied to corresponding ones of said keywords or phrases.

31. The server device according to claim 20 wherein said message is any one or more of an email message, a text message, a multi-media message, a peer-to-peer message, an instant message or a mobile TTY message.

32. The server device according to claim 20 wherein said modifying comprises incorporating additional multimedia content in said message that is visible in said message.

33. The server device according to claim 32 further comprising instructions for, wherein upon detecting that said message has been closed, if said additional multimedia content has not been viewed according to predetermined criteria, displaying said additional multimedia content for a predetermined period.

34. The server device according to claim 20 further comprising instructions for incorporating multiple layers of multimedia content by enabling one layer of multimedia content to be displayed when a focus is placed on said portion and enabling another layer of multimedia content to be displayed upon selection of said linking mechanism or upon selection of said one layer of multimedia content.

35. The server device according to claim 20 further comprising instructions for enabling providers of said multimedia content to bid on said predetermined criteria.

36. The server device according to claim 20 further comprising instructions for limiting a number of said linking mechanisms in said message according to a predetermined maximum threshold.

37. The server device according to claim 36 wherein said limiting comprises discarding lower priority matches.

38. The server device according to claim 20 wherein said one or more profiles are used only if the number of matches is greater than a predetermined number.

* * * * *